US012136103B2

(12) United States Patent
Brown

(10) Patent No.: US 12,136,103 B2
(45) Date of Patent: Nov. 5, 2024

(54) METHOD AND APPARATUS FOR PRESENTING REAL-TIME VIDEO INFORMATION IN A CALL

(71) Applicant: Vusura Technology LLC, Henderson, NV (US)

(72) Inventor: Wendell D. Brown, Henderson, NV (US)

(73) Assignee: VUSURA TECHNOLOGY LLC, Henderson, NV (US)

( * ) Notice: Subject to any disclaimer, the term of this patent is extended or adjusted under 35 U.S.C. 154(b) by 0 days.

(21) Appl. No.: 18/414,980

(22) Filed: Jan. 17, 2024

(65) Prior Publication Data

US 2024/0152953 A1    May 9, 2024

Related U.S. Application Data

(63) Continuation of application No. 18/389,062, filed on Nov. 13, 2023, which is a continuation of application
(Continued)

(51) Int. Cl.
*G06Q 30/0241* (2023.01)
*H04M 1/00* (2006.01)
(Continued)

(52) U.S. Cl.
CPC .......... *G06Q 30/0241* (2013.01); *H04M 1/00* (2013.01); *H04M 1/72439* (2021.01);
(Continued)

(58) Field of Classification Search
CPC .... G06F 3/04895; G06F 3/016; G06F 3/0482; G06F 3/04886; G06F 9/454; G06Q 30/02;
(Continued)

(56) References Cited

U.S. PATENT DOCUMENTS

| 5,117,454 A | 5/1992 | Yamase |
| 5,555,288 A | 9/1996 | Wilson |

(Continued)

FOREIGN PATENT DOCUMENTS

| EP | 0539104 A2 | 4/1993 |
| EP | 1185064 A2 | 3/2002 |

(Continued)

OTHER PUBLICATIONS

Apple, Inc. Invalidity Contentions, *Maxell, Ltd.* v. *Apple Inc.*, Civil Action No. 5:19-cv-00036-RWS (E.D. TX) dated Aug. 14, 2019 (IPR2020-00200, Ex. 2012), 135 pages.

(Continued)

*Primary Examiner* — Gerald Gauthier
(74) *Attorney, Agent, or Firm* — Vorys, Sater, Seymour and Pease LLP

(57) ABSTRACT

A method and apparatus are provided for presenting multimedia content to a caller and/or a called party in association with a telephone call. Content may be presented pre-ring (before the called party's telephone rings), in-call, and/or post-call. Content presented to a party may be related to another party participating in the call or may be related to a third party (e.g., an advertiser that paid for the ability to have its content presented). Presented content may be actuable, to allow a caller to change the destination of a call, take advantage of an offer presented to him or her, redeem a coupon, schedule or queue a subsequent call, etc. To find a desired destination party, a caller may initiate a manual or automatic search of his or her local contacts (on his telephone) and/or a central or global directory or contact list.

24 Claims, 12 Drawing Sheets

Related U.S. Application Data

No. 17/544,751, filed on Dec. 7, 2021, which is a continuation of application No. 16/597,052, filed on Oct. 9, 2019, now Pat. No. 11,227,303, which is a continuation of application No. 15/790,949, filed on Oct. 23, 2017, now Pat. No. 10,511,942, which is a continuation of application No. 14/951,399, filed on Nov. 24, 2015, now Pat. No. 9,819,812, which is a continuation of application No. 14/327,332, filed on Jul. 9, 2014, now Pat. No. 9,264,540, which is a continuation of application No. 14/041,879, filed on Sep. 30, 2013, now Pat. No. 8,804,930, which is a continuation of application No. 12/563,112, filed on Sep. 18, 2009, now Pat. No. 8,577,000.

(60) Provisional application No. 61/167,105, filed on Apr. 6, 2009.

(51) Int. Cl.

| | | |
|---|---|---|
| *H04M 1/72439* | (2021.01) | |
| *H04M 1/72457* | (2021.01) | |
| *H04M 1/72469* | (2021.01) | |
| *H04M 3/42* | (2006.01) | |
| *H04M 3/436* | (2006.01) | |
| *H04M 3/487* | (2006.01) | |
| *H04M 7/00* | (2006.01) | |
| *H04M 15/00* | (2006.01) | |
| *H04W 4/12* | (2009.01) | |
| *H04W 4/16* | (2009.01) | |
| *H04W 4/18* | (2009.01) | |
| *H04W 4/20* | (2018.01) | |
| *H04W 4/23* | (2018.01) | |
| *H04W 4/21* | (2018.01) | |

(52) U.S. Cl.
CPC ... *H04M 1/72457* (2021.01); *H04M 1/72469* (2021.01); *H04M 3/42051* (2013.01); *H04M 3/42059* (2013.01); *H04M 3/4365* (2013.01); *H04M 3/4878* (2013.01); *H04M 7/0036* (2013.01); *H04M 7/0051* (2013.01); *H04M 15/00* (2013.01); *H04M 15/61* (2013.01); *H04M 15/8083* (2013.01); *H04M 15/8351* (2013.01); *H04M 15/8353* (2013.01); *H04M 15/8355* (2013.01); *H04M 15/846* (2013.01); *H04W 4/12* (2013.01); *H04W 4/16* (2013.01); *H04W 4/18* (2013.01); *H04W 4/20* (2013.01); *H04W 4/23* (2018.02); *H04M 15/83* (2013.01); *H04M 15/848* (2013.01); *H04M 15/85* (2013.01); *H04M 2203/6054* (2013.01); *H04M 2215/7231* (2013.01); *H04M 2242/30* (2013.01); *H04W 4/21* (2018.02)

(58) Field of Classification Search
CPC .... G06Q 30/0241; G06Q 10/02; G06Q 10/10; G06Q 30/0271; G06Q 30/0281; H04L 65/1069; H04L 65/1096; H04L 67/14; H04L 69/329; H04L 51/00; H04L 65/1036; H04L 65/1076; H04M 1/00; H04M 1/642; H04M 1/72439; H04M 1/72445; H04M 1/72457; H04M 1/72469; H04M 3/42051; H04M 3/42059; H04M 3/42204; H04M 3/4365; H04M 3/4878; H04M 7/003; H04M 7/0036; H04M 7/0051; H04M 7/0057; H04M 15/00; H04M 15/61; H04M 15/8083; H04M 15/83; H04M 15/8351; H04M 15/8353; H04M 15/8355; H04M 15/848; H04M 15/85; H04M 2203/6054; H04M 2215/7231; H04M 2242/30; H04M 1/247; H04M 1/27457; H04M 1/56; H04M 1/724; H04M 3/428; H04M 3/432; H04M 3/4931; H04M 3/53341; H04M 3/565; H04M 15/1069; H04M 15/47; H04M 15/51; H04M 19/042; H04W 4/12; H04W 4/16; H04W 4/18; H04W 4/20; H04W 4/21; H04W 4/23; H04W 68/005; H04W 4/02; H04W 4/24; G06T 5/50; G06V 40/19; H04N 5/907; H04N 21/4223; H04Q 3/66; H04Q 3/74

See application file for complete search history.

(56) References Cited

U.S. PATENT DOCUMENTS

| | | | |
|---|---|---|---|
| 5,825,870 | A | 10/1998 | Miloslavsky |
| 5,875,231 | A | 2/1999 | Farfan |
| 5,940,484 | A | 8/1999 | Defazio et al. |
| 5,960,073 | A | 9/1999 | Kikinis et al. |
| 5,999,599 | A * | 12/1999 | Shaffer ............... H04Q 3/74 379/142.01 |
| 6,011,909 | A * | 1/2000 | Newlin ............... H04M 3/428 709/227 |
| 6,044,148 | A | 3/2000 | Bleile |
| 6,079,020 | A | 6/2000 | Liu |
| 6,084,628 | A | 7/2000 | Sawyer |
| 6,134,223 | A | 10/2000 | Burke et al. |
| 6,167,432 | A | 12/2000 | Jiang |
| 6,271,950 | B1 | 8/2001 | Hansen |
| 6,301,342 | B1 | 10/2001 | Ander |
| 6,493,020 | B1 | 12/2002 | Stevenson et al. |
| 6,493,437 | B1 | 12/2002 | Olshansky |
| 6,542,587 | B1 * | 4/2003 | Bryde ............... H04L 67/14 379/93.23 |
| 6,553,115 | B1 | 4/2003 | Mashinsky |
| 6,567,813 | B1 | 5/2003 | Zhu et al. |
| 6,601,087 | B1 | 7/2003 | Zhu et al. |
| 6,621,899 | B2 | 9/2003 | Dezonno |
| 6,646,655 | B1 | 11/2003 | Brandt et al. |
| 6,654,032 | B1 | 11/2003 | Zhu et al. |
| 6,728,353 | B1 | 4/2004 | Espejo |
| 6,763,501 | B1 | 7/2004 | Zhu et al. |
| 6,789,119 | B1 | 9/2004 | Zhu et al. |
| RE38,609 | E | 10/2004 | Chen et al. |
| 6,810,034 | B1 | 10/2004 | Brand |
| 6,810,488 | B2 | 10/2004 | Teng |
| 6,816,616 | B2 | 11/2004 | Teng |
| 6,856,673 | B1 | 2/2005 | Banks |
| 6,901,448 | B2 | 5/2005 | Zhu et al. |
| 6,925,645 | B2 | 8/2005 | Zhu et al. |
| 6,947,531 | B1 | 9/2005 | Lewis |
| 6,977,993 | B2 | 12/2005 | Starbuck |
| 7,031,342 | B2 | 4/2006 | Teng |
| 7,043,677 | B1 | 5/2006 | Li |
| 7,062,032 | B1 | 6/2006 | Bloom |
| 7,069,298 | B2 | 6/2006 | Zhu et al. |
| 7,072,657 | B2 | 7/2006 | Watanabe |
| 7,120,235 | B2 | 10/2006 | Altberg |
| 7,130,883 | B2 | 10/2006 | Zhu et al. |
| 7,203,755 | B2 | 4/2007 | Zhu et al. |
| 7,216,172 | B2 | 5/2007 | Yang et al. |
| 7,353,253 | B1 | 4/2008 | Zhao |
| 7,373,650 | B1 | 5/2008 | Rodriguez et al. |
| 7,418,092 | B2 | 8/2008 | Brown |
| 7,450,704 | B2 | 11/2008 | Lund |
| 7,548,255 | B2 | 6/2009 | Bear et al. |
| 7,565,680 | B1 | 7/2009 | Asmussen |
| 7,593,514 | B1 | 9/2009 | Zhuang et al. |
| 7,644,859 | B1 | 1/2010 | Zhu |
| 7,743,024 | B2 | 6/2010 | Mandre et al. |
| 7,761,323 | B2 | 7/2010 | Rafter et al. |
| 7,817,625 | B2 | 10/2010 | Jefremov |
| D627,791 | S | 11/2010 | Lamb et al. |

(56) References Cited

U.S. PATENT DOCUMENTS

| | | | |
|---|---|---|---|
| 7,826,605 B1 * | 11/2010 | Vanier | H04M 3/4878 |
| | | | 455/414.1 |
| 7,831,029 B2 | 11/2010 | Gross et al. | |
| 7,860,071 B2 | 12/2010 | Hinrikus et al. | |
| 7,885,726 B2 | 2/2011 | Walker | |
| 7,899,710 B1 | 3/2011 | Walker | |
| 7,912,458 B2 | 3/2011 | Ramer et al. | |
| 7,941,481 B1 * | 5/2011 | Partovi | H04L 65/1096 |
| | | | 709/219 |
| 7,945,621 B2 | 5/2011 | Yuan et al. | |
| 7,959,074 B1 | 6/2011 | Chopra | |
| 7,991,001 B2 | 8/2011 | Nix et al. | |
| 7,991,894 B2 | 8/2011 | Koskelainen | |
| 7,995,728 B1 | 8/2011 | Martin | |
| 7,996,775 B2 | 8/2011 | Cole et al. | |
| 8,009,572 B2 | 8/2011 | Heinla et al. | |
| 8,014,511 B2 | 9/2011 | Kaal et al. | |
| 8,041,344 B1 | 10/2011 | Coughlan | |
| 8,046,008 B2 | 10/2011 | Park | |
| 8,068,926 B2 | 11/2011 | Andersen | |
| 8,069,049 B2 | 11/2011 | Nilsson et al. | |
| 8,073,118 B2 | 12/2011 | Sterman | |
| 8,081,751 B1 | 12/2011 | Martin et al. | |
| 8,085,930 B2 | 12/2011 | Sorensen et al. | |
| 8,086,488 B2 | 12/2011 | Liu | |
| 8,090,092 B2 | 1/2012 | Madanes et al. | |
| 8,091,116 B2 | 1/2012 | Kutt et al. | |
| 8,103,257 B2 | 1/2012 | Delia | |
| 8,107,600 B1 | 1/2012 | O'Keefe | |
| 8,107,610 B2 | 1/2012 | Harris, Jr. et al. | |
| 8,108,781 B2 | 1/2012 | Laansoo et al. | |
| 8,115,819 B2 | 2/2012 | Anderson | |
| 8,121,264 B1 | 2/2012 | Hogg, Jr. | |
| 8,121,898 B2 | 2/2012 | Altberg | |
| 8,170,185 B2 | 5/2012 | Kutt | |
| 8,194,706 B2 | 6/2012 | Rodbro et al. | |
| 8,194,725 B2 | 6/2012 | Vos | |
| 8,200,692 B2 | 6/2012 | Xu | |
| 8,209,385 B2 | 6/2012 | Partaker et al. | |
| 8,223,749 B2 | 7/2012 | Lamb et al. | |
| 8,224,307 B2 | 7/2012 | Ray | |
| 8,233,601 B2 | 7/2012 | Mendiola | |
| 8,234,167 B2 | 7/2012 | Civanlar | |
| 8,239,304 B1 | 8/2012 | Ahmad | |
| 8,243,909 B2 | 8/2012 | Wood | |
| 8,245,266 B2 | 8/2012 | Jefremov et al. | |
| 8,270,958 B2 | 9/2012 | Olshansky | |
| 8,279,968 B2 | 10/2012 | Lindblom et al. | |
| 8,290,810 B2 | 10/2012 | Ramer | |
| 8,301,125 B2 | 10/2012 | Ramer et al. | |
| 8,315,608 B2 | 11/2012 | Cha | |
| 8,315,614 B2 | 11/2012 | No | |
| 8,320,878 B2 | 11/2012 | Vakil | |
| 8,320,889 B2 | 11/2012 | Lee | |
| 8,325,213 B2 | 12/2012 | Lamb et al. | |
| 8,326,271 B2 | 12/2012 | Satake | |
| 8,340,136 B2 | 12/2012 | Rodbro et al. | |
| 8,345,581 B2 | 1/2013 | Mandre | |
| 8,345,835 B1 | 1/2013 | Or-Bach et al. | |
| 8,355,691 B2 | 1/2013 | Roy | |
| 8,358,600 B2 | 1/2013 | Bevin et al. | |
| 8,363,087 B2 | 1/2013 | Iwabuchi et al. | |
| 8,364,521 B2 | 1/2013 | Ramer et al. | |
| 8,385,325 B2 | 2/2013 | Vafin et al. | |
| 8,412,284 B2 | 4/2013 | Khoshaba | |
| 8,417,225 B2 | 4/2013 | Mock | |
| 8,417,784 B2 | 4/2013 | Mandre | |
| 8,429,285 B2 | 4/2013 | Lindblom | |
| 8,452,270 B2 | 5/2013 | Lee | |
| 8,458,756 B2 | 6/2013 | Rodriguez et al. | |
| 8,467,505 B2 | 6/2013 | Howell | |
| 8,472,612 B1 | 6/2013 | Goringe et al. | |
| 8,509,748 B2 | 8/2013 | McKenna | |
| 8,532,276 B2 | 9/2013 | Altberg | |
| 8,532,630 B2 | 9/2013 | Mottes | |
| 8,554,172 B2 | 10/2013 | Dammrose | |
| 8,571,607 B1 | 10/2013 | Zarrow | |
| 8,571,882 B1 | 10/2013 | Teitelbaum | |
| 8,577,000 B1 * | 11/2013 | Brown | H04M 3/42059 |
| | | | 379/88.13 |
| 8,582,542 B2 | 11/2013 | Kutt et al. | |
| 8,600,369 B2 | 12/2013 | Tong | |
| 8,600,951 B2 | 12/2013 | Bosley et al. | |
| 8,606,239 B2 | 12/2013 | Yach | |
| 8,639,214 B1 | 1/2014 | Fujisaki | |
| 8,649,810 B2 | 2/2014 | Reinhold | |
| 8,660,246 B2 | 2/2014 | Brown | |
| 8,660,247 B1 | 2/2014 | Brown | |
| 8,667,136 B2 | 3/2014 | Madanes et al. | |
| 8,687,787 B2 | 4/2014 | Stille | |
| 8,694,915 B2 | 4/2014 | Cadiz et al. | |
| 8,705,721 B2 | 4/2014 | Raju et al. | |
| 8,711,841 B2 | 4/2014 | Oruaas et al. | |
| 8,717,399 B2 | 5/2014 | Izotov et al. | |
| 8,725,121 B2 | 5/2014 | Dragt | |
| 8,737,974 B1 | 5/2014 | Sennett et al. | |
| 8,750,906 B2 | 6/2014 | Winkler | |
| 8,755,375 B2 | 6/2014 | Haley et al. | |
| 8,798,036 B2 | 8/2014 | Kut et al. | |
| 8,804,930 B1 | 8/2014 | Brown | |
| 8,819,216 B2 | 8/2014 | Kelder et al. | |
| 8,838,444 B2 | 9/2014 | Vos et al. | |
| 8,855,287 B1 | 10/2014 | Bates | |
| 8,862,993 B2 | 10/2014 | Vitorino et al. | |
| 8,875,208 B1 | 10/2014 | Abkairov et al. | |
| 8,886,719 B2 | 11/2014 | Houghton et al. | |
| 8,891,751 B2 | 11/2014 | Cheung | |
| 8,909,203 B1 | 12/2014 | Hertzfeld et al. | |
| 8,938,217 B2 | 1/2015 | Dorogusker et al. | |
| 8,977,242 B1 | 3/2015 | Brown | |
| 9,026,066 B2 | 5/2015 | Seo et al. | |
| 9,032,030 B2 | 5/2015 | Tuubel et al. | |
| 9,060,048 B2 | 6/2015 | Brown | |
| 9,071,670 B2 | 6/2015 | Brown | |
| 9,078,113 B1 | 7/2015 | Brown | |
| 9,124,758 B2 | 9/2015 | Iwabuchi et al. | |
| 9,137,378 B2 | 9/2015 | Brown | |
| 9,137,379 B2 | 9/2015 | Brown | |
| 9,184,938 B2 | 11/2015 | Kutt et al. | |
| 9,197,678 B2 | 11/2015 | Heinla | |
| 9,203,954 B1 * | 12/2015 | Van Rensburg | H04M 3/42059 |
| 9,237,214 B2 | 1/2016 | Reitalu et al. | |
| 9,264,540 B2 | 2/2016 | Brown | |
| 9,270,820 B2 | 2/2016 | Brown | |
| 9,313,247 B2 | 4/2016 | Jefremov | |
| 9,417,785 B1 | 8/2016 | Brown et al. | |
| 9,426,309 B1 | 8/2016 | Brown | |
| 9,432,618 B2 | 8/2016 | Iwabuchi et al. | |
| 9,432,824 B2 | 8/2016 | Brown | |
| 9,536,256 B2 | 1/2017 | Toomer | |
| 9,578,474 B2 | 2/2017 | Brown | |
| 9,584,563 B2 | 2/2017 | Partaker et al. | |
| 9,667,810 B1 * | 5/2017 | Brown | H04M 15/8355 |
| 9,723,157 B2 | 8/2017 | Brown | |
| 9,723,268 B2 | 8/2017 | Iwabuchi et al. | |
| 9,756,004 B2 | 9/2017 | Hiir et al. | |
| 9,794,422 B2 | 10/2017 | Brown | |
| 9,819,812 B2 | 11/2017 | Brown | |
| 9,838,541 B2 | 12/2017 | Brown | |
| 9,913,118 B1 | 3/2018 | Brown | |
| 10,070,099 B2 | 9/2018 | Iwabuchi et al. | |
| 10,084,991 B2 | 9/2018 | Iwabuchi et al. | |
| 10,182,163 B2 | 1/2019 | Brown | |
| 10,192,225 B2 | 1/2019 | Newman | |
| 10,198,741 B2 | 2/2019 | Brown | |
| 10,298,776 B2 | 5/2019 | Brown | |
| 10,389,978 B2 | 8/2019 | Iwabuchi et al. | |
| 10,447,866 B2 | 10/2019 | Brown | |
| 10,511,942 B2 | 12/2019 | Brown | |
| 10,911,719 B2 | 2/2021 | Iwabuchi et al. | |
| 11,227,303 B2 | 1/2022 | Brown | |
| 11,539,921 B2 | 12/2022 | Iwabuchi et al. | |
| 2001/0040887 A1 | 11/2001 | Shtivelman | |

(56) References Cited

U.S. PATENT DOCUMENTS

| | | |
|---|---|---|
| 2002/0057788 A1* | 5/2002 | Cox ............... H04M 3/53341 379/265.01 |
| 2002/0076031 A1 | 6/2002 | Falcon et al. |
| 2003/0002479 A1 | 1/2003 | Vortman |
| 2003/0007620 A1* | 1/2003 | Elsey ............... H04M 3/432 379/218.01 |
| 2003/0059023 A1 | 3/2003 | Crockett |
| 2003/0128698 A1 | 7/2003 | Darland |
| 2003/0165223 A1* | 9/2003 | Timmins ............ G06Q 10/02 379/207.02 |
| 2003/0182375 A1 | 9/2003 | Zhu et al. |
| 2003/0206619 A1 | 11/2003 | Curbow |
| 2003/0215079 A1* | 11/2003 | Watanabe ......... H04M 7/0057 379/219 |
| 2003/0223564 A1* | 12/2003 | Baker ................ H04Q 3/66 379/218.01 |
| 2004/0031064 A1 | 2/2004 | Lindstrom et al. |
| 2004/0057419 A1 | 3/2004 | Stanford |
| 2004/0141508 A1 | 7/2004 | Schoeneberger |
| 2004/0161097 A1* | 8/2004 | Henry ................ H04M 15/51 379/266.02 |
| 2004/0172325 A1* | 9/2004 | Blanco .............. G06Q 30/0241 705/26.1 |
| 2004/0190688 A1* | 9/2004 | Timmins ............ H04M 3/4878 379/88.22 |
| 2004/0196868 A1 | 10/2004 | King |
| 2004/0203660 A1 | 10/2004 | Tibrewal |
| 2005/0026594 A1* | 2/2005 | Miller ................ H04M 15/47 455/410 |
| 2005/0079895 A1* | 4/2005 | Kalenius ........... G06F 3/04895 455/566 |
| 2005/0094781 A1* | 5/2005 | Basu .................. H04M 1/642 379/88.16 |
| 2005/0113074 A1* | 5/2005 | Holt ................. H04M 3/42204 455/563 |
| 2005/0123104 A1* | 6/2005 | Bishop ............. H04M 3/4931 379/88.04 |
| 2005/0123118 A1 | 6/2005 | Terry |
| 2005/0165640 A1 | 7/2005 | Kotorov |
| 2005/0201530 A1* | 9/2005 | Koch ............... H04M 1/27457 379/88.04 |
| 2005/0233733 A1* | 10/2005 | Roundtree ............ G06F 9/454 455/414.1 |
| 2006/0045240 A1 | 3/2006 | Buchner |
| 2006/0165066 A1 | 7/2006 | Campbell |
| 2006/0210041 A1 | 9/2006 | Citron |
| 2006/0218286 A1 | 9/2006 | Brombal |
| 2006/0233333 A1 | 10/2006 | Brombal |
| 2006/0256949 A1 | 11/2006 | Noble, Jr. |
| 2006/0277108 A1* | 12/2006 | Altberg ............... G06Q 30/02 705/14.69 |
| 2007/0003043 A1 | 1/2007 | Kapur |
| 2007/0022159 A1 | 1/2007 | Zhu et al. |
| 2007/0030338 A1 | 2/2007 | Jiang |
| 2007/0036291 A1* | 2/2007 | Graham ............... H04L 51/00 379/88.13 |
| 2007/0058637 A1 | 3/2007 | Lo |
| 2007/0060109 A1 | 3/2007 | Ramer et al. |
| 2007/0118592 A1 | 5/2007 | Bachenberg |
| 2007/0118602 A1 | 5/2007 | Heinla et al. |
| 2007/0123311 A1 | 5/2007 | Kim |
| 2007/0127685 A1 | 6/2007 | Bae |
| 2007/0139514 A1 | 6/2007 | Marley |
| 2007/0140446 A1 | 6/2007 | Haldeman |
| 2007/0156810 A1 | 7/2007 | Kumar |
| 2007/0156923 A1 | 7/2007 | Kumar |
| 2007/0162296 A1 | 7/2007 | Altberg |
| 2007/0189474 A1 | 8/2007 | Cai |
| 2007/0189497 A1 | 8/2007 | Bareis |
| 2007/0207782 A1 | 9/2007 | Tran |
| 2007/0245022 A1 | 10/2007 | Olliphant |
| 2007/0250581 A1 | 10/2007 | Patel |
| 2008/0013706 A1* | 1/2008 | Kelley ................ H04M 3/565 379/202.01 |
| 2008/0037754 A1 | 2/2008 | Bishop |
| 2008/0076409 A1 | 3/2008 | Hinrikus et al. |
| 2008/0120176 A1 | 5/2008 | Batni |
| 2008/0158385 A1* | 7/2008 | Lee ..................... H04N 5/907 386/E5.067 |
| 2008/0167944 A1 | 7/2008 | Keithly |
| 2008/0170677 A1 | 7/2008 | Kutt et al. |
| 2008/0177662 A1 | 7/2008 | Smith |
| 2008/0181372 A1 | 7/2008 | Heldenbrand |
| 2008/0203153 A1 | 8/2008 | Keithley |
| 2008/0214148 A1 | 9/2008 | Ramer et al. |
| 2008/0243806 A1* | 10/2008 | Dalal ................ H04M 1/72445 707/999.005 |
| 2008/0250110 A1 | 10/2008 | Zhao |
| 2008/0254773 A1 | 10/2008 | Lee |
| 2009/0022149 A1* | 1/2009 | Rosenberg .......... H04L 65/1036 370/389 |
| 2009/0054092 A1 | 2/2009 | Stonefield et al. |
| 2009/0086953 A1 | 4/2009 | Vendrow |
| 2009/0097471 A1 | 4/2009 | Qiu |
| 2009/0103706 A1* | 4/2009 | Zazza ................ H04M 7/003 379/218.01 |
| 2009/0129578 A1 | 5/2009 | Zhou |
| 2009/0136018 A1 | 5/2009 | Oldach |
| 2009/0147772 A1 | 6/2009 | Rao et al. |
| 2009/0174763 A1* | 7/2009 | Bengtsson ......... H04N 21/4223 348/14.08 |
| 2009/0176574 A1 | 7/2009 | Lamb et al. |
| 2009/0178118 A1 | 7/2009 | Cedo |
| 2009/0203361 A1* | 8/2009 | Huang ................ H04M 1/56 455/414.1 |
| 2009/0247231 A1* | 10/2009 | Guo .................. H04M 1/72436 345/173 |
| 2009/0276308 A1 | 11/2009 | Wang |
| 2009/0323677 A1* | 12/2009 | Mehmood .......... H04L 65/1069 370/352 |
| 2010/0013761 A1* | 1/2010 | Birnbaum ............ G06F 3/016 340/407.1 |
| 2010/0014647 A1 | 1/2010 | Subramaniam |
| 2010/0017861 A1* | 1/2010 | Krishnaswamy ..... H04L 69/329 709/228 |
| 2010/0023813 A1* | 1/2010 | Zheng ............... H04L 65/1076 714/49 |
| 2010/0063874 A1 | 3/2010 | Keithley |
| 2010/0145851 A1 | 6/2010 | Van Rensburg |
| 2010/0161526 A1 | 6/2010 | Zhang |
| 2010/0162249 A1 | 6/2010 | Shpelsman |
| 2010/0226362 A1* | 9/2010 | Kim .................... H04W 4/24 370/352 |
| 2010/0251124 A1* | 9/2010 | Geppert .............. H04M 1/247 715/835 |
| 2010/0304788 A1* | 12/2010 | Mun ................. H04M 1/72457 455/556.1 |
| 2011/0045761 A1* | 2/2011 | Rolf .................... H04W 4/02 455/3.06 |
| 2011/0131537 A1* | 6/2011 | Cho .................... G06F 3/0482 715/863 |
| 2011/0312279 A1* | 12/2011 | Tsai ................... H04W 4/21 455/67.11 |
| 2011/0312308 A1 | 12/2011 | Willey |
| 2012/0054039 A1* | 3/2012 | Patwa ................ G06Q 30/0271 705/14.66 |
| 2012/0071144 A1 | 3/2012 | Owen |
| 2012/0083251 A1 | 4/2012 | Kuhl |
| 2013/0053005 A1 | 2/2013 | Ramer et al. |
| 2013/0090100 A1 | 4/2013 | Schroeter |
| 2013/0115926 A1 | 5/2013 | Fux |
| 2014/0018052 A1 | 1/2014 | Wuthnow |
| 2014/0038570 A1 | 2/2014 | Lindroos et al. |
| 2014/0194090 A1 | 7/2014 | Gonen et al. |
| 2014/0315526 A1 | 10/2014 | Tanaka |
| 2014/0321625 A1 | 10/2014 | Brown |
| 2014/0321626 A1 | 10/2014 | Brown |
| 2014/0321627 A1 | 10/2014 | Brown |
| 2014/0321628 A1 | 10/2014 | Brown |

(56) References Cited

U.S. PATENT DOCUMENTS

| | | |
|---|---|---|
| 2014/0321629 A1 | 10/2014 | Brown |
| 2014/0321630 A1 | 10/2014 | Brown |
| 2014/0372236 A1* | 12/2014 | Sylvester ........... G06Q 30/0281 |
| | | 705/22 |
| 2015/0264174 A1 | 9/2015 | Brown |
| 2016/0080565 A1 | 3/2016 | Brown |
| 2016/0080915 A1 | 3/2016 | Brown |
| 2016/0080917 A1 | 3/2016 | Brown |
| 2016/0080919 A1 | 3/2016 | Brown |
| 2016/0094705 A1* | 3/2016 | Vendrow ................ G06V 40/19 |
| | | 382/103 |
| 2016/0094708 A1* | 3/2016 | Brown .............. H04M 15/8351 |
| | | 455/566 |
| 2016/0219142 A1* | 7/2016 | Brown ................ H04W 68/005 |
| 2016/0219150 A1* | 7/2016 | Brown .................... H04W 4/16 |
| 2016/0330333 A1 | 11/2016 | Brown |
| 2016/0378277 A1* | 12/2016 | Cho .................... G06F 3/04886 |
| | | 715/814 |
| 2017/0265028 A1* | 9/2017 | Topalli ................ H04M 19/042 |
| 2017/0302709 A1* | 10/2017 | Jones ..................... G06Q 10/10 |
| 2018/0048770 A1 | 2/2018 | Brown |
| 2018/0198925 A1 | 7/2018 | Brown |
| 2019/0236765 A1* | 8/2019 | Yeo ........................... G06T 5/50 |
| 2020/0045512 A1 | 2/2020 | Brown |
| 2022/0092633 A1 | 3/2022 | Brown |
| 2024/0152953 A1* | 5/2024 | Brown .............. H04M 15/8083 |

FOREIGN PATENT DOCUMENTS

| | | |
|---|---|---|
| EP | 0908047 B1 | 9/2004 |
| EP | 1283635 B1 | 2/2006 |
| JP | 2008246232 A | 10/2008 |
| JP | 2010081220 A | 4/2010 |
| WO | 2005086856 A2 | 9/2005 |

OTHER PUBLICATIONS

Apple, Inc. Invalidity Contentions, Exhibit E2, *Maxell, Ltd.* v. *Apple Inc.*, Civil Action No. 5:19-cv-00036-RWS (E. D. TX) dated Aug. 14, 2019 (IPR2020-00200, Ex. 2013), pp. 1-77.

Decision Granting Institution of Inter Partes Review, 35 U.S.C. § 314, *Apple Inc.* v. *Maxell, Ltd.*, IPR2020-00200, U.S. Pat. No. 10,084,991 B2, Paper No. 11 entered Jul. 15, 2020, pp. 1-103.

* cited by examiner

METHOD AND APPARATUS FOR PRESENTING REAL-TIME VIDEO INFORMATION IN A CALL

RELATED APPLICATIONS

This application is a continuation of U.S. patent application Ser. No. 18/389,062 (the '062 application), filed Nov. 13, 2023. The '062 application is a continuation of U.S. patent application Ser. No. 17/544,751 (the '751 application), filed Dec. 7, 2021. The '751 application is a continuation of U.S. patent application Ser. No. 16/597,052 (the '052 application), filed Oct. 9, 2019, issued as U.S. Pat. No. 11,227,303. The '052 application is a continuation of U.S. patent application Ser. No. 15/790,949 (the '949 application), filed Oct. 23, 2017, issued as U.S. Pat. No. 10,511,942. The '949 application is a continuation of U.S. patent application Ser. No. 14/951,399 (the '399 application), filed Nov. 24, 2015 and issued Nov. 14, 2017 as U.S. Pat. No. 9,819,812. The '399 application is a continuation of U.S. patent application Ser. No. 14/327,332 (the '332 application), filed Jul. 9, 2014 and issued Feb. 16, 2016 as U.S. Pat. No. 9,264,540. The '332 application is a continuation of U.S. patent application Ser. No. 14/041,879 (the '879 application), filed Sep. 30, 2013 and issued Aug. 12, 2014 as U.S. Pat. No. 8,804,930. The '879 application is a continuation of U.S. patent application Ser. No. 12/563,112 (the '112 application), filed Sep. 18, 2009 and issued Nov. 5, 2013 as U.S. Pat. No. 8,577,000. The '112 application claims priority to U.S. Provisional Application No. 61/167,105, filed Apr. 6, 2009. The preceding patent applications and provisional patent application are hereby incorporated by reference.

BACKGROUND

This invention relates to the fields of telecommunications and computer systems. More particularly, a method and apparatus are provided for presenting multimedia content to a caller and/or a called party before, during, and/or after a telephone call between the parties.

Calls from or to a mobile telephone are typically accompanied by minimal display content. For example, when placing a call, the caller may simply see a dialer screen used to enter a telephone number, or to select a number or contact to be dialed. When receiving a call, a called party may see the caller's telephone number (or some other display if the number is blocked or unknown) or a name of the caller (if the caller's telephone number is stored in the called party's contacts), but little else.

Although this information display may be sufficient for the basic purpose of identifying who is being called or who has originated a call, it fails to deliver the type of multimedia experience many people have come to expect in the electronic age. Just as computer systems have evolved from textual operating systems (e.g., DOS or Disk Operating System) to complex graphical operating systems (e.g., Mac OS®, Microsoft Windows®), the display capabilities of mobile telephones have evolved in a similar manner.

Although mobile telephone applications that operate independently of telephone calls have been developed to take advantage of the telephones' richer display capabilities, such as offline games, photography, and GPS (Global Positioning System) navigation, applications that make and receive calls or that operate during a call have not. Therefore, there is a need for methods and apparatus for enriching the experience of a person making or receiving a call.

SUMMARY

In some embodiments, a method and apparatus are provided for presenting multimedia content to a caller and/or a called party in association with a telephone call. In these embodiments, content may be presented pre-ring (before the called party's telephone rings), in-call (during the call) and/or post-call (after one or both parties have hung up).

Content presented to a party may be related to another party participating in the call or may be related to a third party (e.g., an advertiser that paid to have its content presented). Thus, rights to present content to parties engaging in a call may be auctioned to various advertisers and other organizations, and a party to a call may receive content that is or is not associated with any purpose or party to the call.

In some embodiments, presented content may be actuable (i.e., include one or more actuable controls), to allow a caller to change the destination or routing of a call, take advantage of an offer presented to him in the content, redeem a coupon, schedule or queue a subsequent call, etc.

In some embodiments, a person's ability to search for a desired destination party's contact information (e.g., telephone number) or to initiate a call to the party without knowing that party's number is greatly enhanced. In these embodiments, the person may initiate a search of any number of contact lists and/or telephone directories, including lists maintained on his device and/or off his device—such as at a central call server or a third-party repository.

Such a search may be conducted via keyword, so that as the person enters characters describing the target destination (e.g., by name, by category), the search is automatically updated and narrowed as the characters are entered. Results of a search may be filtered or prioritized based on the person's profile (e.g., with contacts known to that person having relatively high priority) and/or by a general profile (e.g., based on which numbers/contacts have been used most often by other people that conducted similar searches).

DETAILED DESCRIPTION

Figure 1:
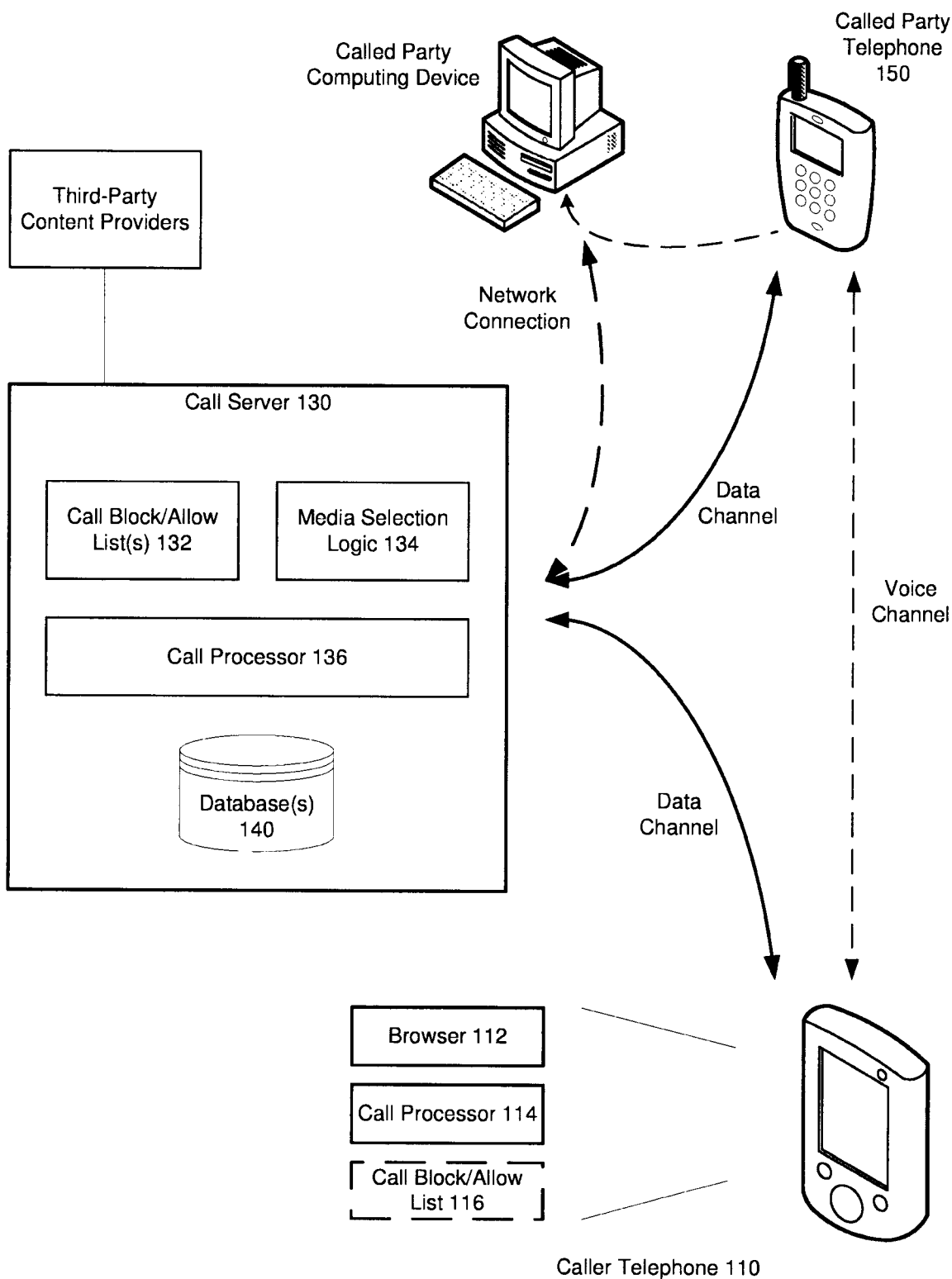
FIG. 1 is a block diagram of a communication environment in which some embodiments of the present invention may be implemented.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments, a method and apparatus are provided for presenting multimedia content before, during, and/or after a telephone call. The content is displayed on a communication device that initiates or receives the call, if the telephone's display is capable of displaying rich content; otherwise, it may be displayed on an associated computing device. In these embodiments, the displayed content may be selected based on an identity or a characteristic of the caller or the called party, may be relevant to a purpose or nature of the call, or may be selected by an entity that paid to have the selected content presented.

For example, for a telephone call between friends or acquaintances, a caller or called party may be presented with content drawn from an electronic presence of the other party (e.g., MySpace™, Facebook, hi5, Flickr®) or from private storage (e.g., the friend's computing device). Or, he may be shown recent electronic mail, other communication(s) involving the friend (e.g., his or her latest tweet on Twitter®), or other multimedia content the friend is willing to share. In some embodiments, people may assemble content for the specific purpose of being presented to another party in association with a telephone call.

For a telephone call with an organization (e.g., a merchant, a business), an advertisement or special offer from that entity (or from an associate or a competitor of that entity) may be presented (e.g., a video ad, a yellow page ad), or a menu or list of services, directions or location information, information regarding a current or recent transaction, etc.

Multimedia content presented before, during, and/or after a telephone call may be accompanied by one or more controls for taking action, such as seeing more content, navigating to a particular web page or web site, downloading content, ordering a good or service, adding another party to the call, re-routing or aborting the call in favor of a different destination, or initiating other action enabled by the content.

Determination of what content to present to a party is made by a call controller. In embodiments of the invention described herein, a controller for a particular telephone call may be the caller, the called party, a call center configured to process content in association with a telephone call, or some other third party. The decision of what to present may be made in real-time, or may be pre-determined.

For example, a commercial message (e.g., an advertisement) may be pre-selected for presentation to some number of callers to a particular telephone number. Merchants or other organizations may pay for the opportunity to have their selected content presented to a caller or called party, even if the paying organization is not a party to the call.

FIG. 1 is a diagram of a communication environment in which multimedia content may be presented in association with a telephone call, according to some embodiments of the invention. In FIG. 1, caller telephone 110 is used to place a call to a called party at called party telephone 150. Call server 130 acts as a call controller to manage the presentation of multimedia content on the caller's telephone and/or the called party's telephone in association with the call.

In FIG. 1, each telephone is capable of supporting parallel data and voice channels. A voice channel between caller telephone 110 and called party telephone 150 may be established through the PSTN (Public Switched Telephone Network), one or more telephone carrier's networks, other public/private networks such as the Internet (e.g., for VoIP calls), etc.

Data channels to/from a party's telephone may be established using EvDO (Evolution Data Optimized or Evolution Data Only), UMTS (Universal Mobile Telecommunications System), HSDPA (High-Speed Downlink Packet Access or High-Speed Downlink Protocol Access), LTE (Long Term Evolution) and/or other communication protocols and links capable of carrying digital data. The data channels are routed via call server 130, and are used to convey content to the telephones and to convey other data to the call server as necessary (e.g., to upload data from a telephone, activate a control within presented content).

Caller telephone 110 hosts any number of applications, applets, plug-ins, or other collections of executable program code. Illustrative code that may be installed on the caller telephone includes browser 112 for presenting and navigating multimedia content, call processor 114 (e.g., a dialer application) for processing an outgoing or incoming call, and optional block/allow list 116.

Call processor 114 comprises logic for detecting and/or controlling telephone events (e.g., dialing of a number, outgoing call ringing, incoming call ringing, outgoing or incoming call connected) and for using the data channel to receive content to be presented and to submit data to the call server. Call processor 114 may comprise logic that hooks into a telephone dialer application and can control how a call is handled. Or, the call processor may comprise logic that replaces or supersedes a telephone's native dialer application.

In some embodiments of the invention, call processor 114 may delay signaling of a voice call from caller telephone 110 to the caller's telephone service provider, in order to delay establishment of the voice channel. The call processor may do this automatically or based on instructions from the call server. Similarly, ringing at a called party's telephone may be delayed.

For example, calls placed to certain numbers or to certain types of parties (e.g., merchants, other organizations) may be delayed while content is selected and transmitted to the caller's telephone. A timer may be displayed on the telephone and/or the caller may be able to terminate the delay and make the call proceed immediately. Thus, a delay may be fixed or may be aborted by the affected party.

A call processor may also comprise logic for performing keyword-based lookups, or may be configured to invoke similar logic that executes separate from the call processor. For example, when a caller enters part (or all) of the name of a person or organization that she wishes to call (or a partial telephone number), the keyword logic will search the called party's telephone for matching contacts.

The call processor, or other logic, may also contact a central location (e.g., call server 130) to initiate a keyword-based search on a larger telephone directory. Thus, a search for a destination party may be automatically conducted on the caller's telephone and/or off the device at a central location (e.g., call server 130) or a third-party directory. As the caller enters additional characters, the search results are narrowed accordingly, and may be prioritized based on the caller's previous interaction with some of the contacts, based on which destination parties other callers selected in similar searches, based on the caller's present location, based on fees paid by merchants for priority listing, etc.

Other software may be installed on a party's communication device to alter or enhance the presentation of media. For example, a set of APIs (Application Programming Interfaces) may be provided to allow injection of particular types of content. The APIs may be used to facilitate presentation of content in association with a telephone call and/or without any association with a telephone call. However, in some embodiments of the invention, a person's communication device need not be modified in any way in order to receive and display content before, during, and/or after a call.

In the illustrated embodiments of the invention, caller telephone 110 (and/or call server 130) automatically blocks or rejects calls attempted between telephone 110 and telephone numbers (and/or people and organizations) identified in a block list. Additionally, or alternatively, an allow list may be maintained to specifically identify telephone numbers with which caller telephone 110 may be connected (e.g., all entries in a contact list or telephone directory maintained on a party's telephone). In yet other embodiments, a single combined block/allow list may be maintained to identify target telephone numbers and indicate whether calls with those numbers are blocked or allowed.

Block/allow lists may be maintained on a user's telephone and/or at a call controller or call server. A block/allow list maintained on telephone 110 (i.e., block/allow list 116) may be considered a "local" list, while a list maintained on a call controller (e.g., block/allow list 132) may be considered a "central" or "global" list.

In some embodiments of the invention, a block/allow list (or other filter) may be used to screen calls to/from malicious telephone numbers or entities. For example, calls received from telephone numbers known to be associated with telemarketers, spammers (e.g., entities that spam via SMS or Short Messaging Service), pranksters, and/or other undesirables may be blocked automatically (or after querying the called party to identify the call as possibly or certainly being from an undesired party).

Illustratively, a global list may be maintained to identify telemarketers and spammers, especially those that call nationally or regionally. A local list may be maintained to block calls from pranksters, people who have made harassing calls and/or other parties from whom calls are not desired.

A called party may identify a caller as malicious (or, alternatively, not malicious) during or after a telephone call from that caller, by activating a control on her telephone. For example, during or after a call from a previously unknown caller, content may be presented to the called party to ask her if the caller is a telemarketer or harasser (or should otherwise be blocked), or if the caller should be added to her contact list. Choosing to add a previously unknown party or number to her contact list may cause the call server to interrogate the caller's telephone or other data source to retrieve a contact card, if one has been prepared for sharing.

In some embodiments of the invention, caller telephone 110 may include additional components or executable code for performing other functions, without exceeding the scope of the present invention. For example, a telephone may also include one or more storage components for storing, among other things, contacts, user preferences, multimedia content to be presented on the telephone or to be transmitted to another party for presentation on their device, etc.

Locally stored content may be quickly presented to a user without having to wait for receipt of the content from call controller 130. Such stored content may be selected for storage and/or presentation randomly, based on an identity of a party or parties within a contact list stored on the telephone, according to an agreement with a third party (e.g., an advertiser) and the call server or call controller, etc.

Called party telephone 150 may be configured similarly to caller telephone 110 (e.g., with a browser, a call processor, a block/allow list). In some embodiments, when a call is being initiated from caller telephone 110 to called party telephone 150, call server 130 may query the called party's telephone to determine if it possesses any content that the called party would like to have presented to the caller. Such content may then be transferred before, during, and/or after the call. Similarly, content from caller telephone 110 may be copied to called party telephone 150.

When a user's telephone is unable to display content chosen for presentation to that user in association with a telephone call, the content may instead be presented via a different device.

For example, and as shown in FIG. 1, a called party (or a caller) may operate an associated computing device (e.g., a desktop computer, a laptop computer, a personal digital assistant, a netbook computer). The computing device may be registered with a call controller (e.g., call server 130) before or during a call (e.g., by IP address or other network address).

When the call controller determines that it cannot present multimedia content on called party telephone 150, it will instead transmit it to the associated computing device. The call controller may determine that it cannot send content to telephone 150 based on the type of telephone or the telephone number (e.g., a landline), because the telephone connection lacks a data channel, because the device is registered in the called party's user profile, etc.

A party's associated computing device may be coupled to call server 130 by a network connection that traverses one or more public or private data networks (e.g., the Internet, an intranet). To register a computing device, a party may operate the computing device to navigate a browser to a registration site or page. There, the party may identify one or more telephone numbers and associate them with the computing device so that when a call is placed to or from one of the telephone numbers, content will be delivered to the computing device instead of the telephone.

Call server 130 comprises central or global block/allow list 132 for screening a call to determine whether it should be placed and/or whether multimedia content should be presented in association with the call. The call server also includes media selection logic 134 for selecting content to be displayed on a caller's or called party's communication or computing device. Call processor 136 is configured to receive or establish data (and/or voice) channels with caller telephone 110 and/or called party telephone 150 via virtually any data protocol and media.

Database(s) 140 are configured to store data regarding subscribers and their communication/computing devices, content that may be presented on such devices, information regarding advertisers and/or other third parties that may provide content, factors for determining or selecting content to be presented for a particular call, etc. Call server 130 may also expose various APIs (Application Programming Interfaces) to allow third parties to provide media for presentation in association with a telephone call, and/or other logic for retrieving such content from a third party.

A call server or call controller according to other embodiments of the invention may be configured to perform a subset or a superset of the operations described herein, and therefore may include fewer or additional components. Call server 130 is an example of a third-party call controller—that is, a controller that is not operated by the caller or the called party. Illustratively, call server 130 may be operated by a telephone service provider, a data management service, a directory service, or other entity with which the caller and/or called party (or their service providers) have established agreements.

In other embodiments of the invention, a call controller may be operated by a caller or called party, particularly when that party represents an organization. Thus, a call to or from a commercial enterprise may be controlled by an agent of that enterprise (e.g., a telephone agent or operator, a sales agent). That agent can select content for presentation on the other party's communication device based on a purpose of the call, a previous or current transaction between the parties, an offer being made to the other party, etc. Or, such content may be selected automatically, based on whether the organization has a pre-existing relationship with the caller (e.g., whether the caller's telephone number is known), which of multiple telephone numbers of the organization the caller called, etc.

In some embodiments of the invention, a call controller or call server may auction or directly sell a right to have content presented to callers and/or called parties. For example, a call server may auction the right to present content to callers that dial a particular organization (e.g., a commercial company) or that are called by the organization. The winner may be the same organization, a competitor, or an unrelated party.

Or, a call server may auction content-presentation rights based on identities or demographics of private callers and calling parties. Thus, content presented to a caller may be selected based on his current location, as reported by a GPS (Global Positioning System) element of his telephone, his area code, his city, his type of communication device, his telephone service provider, and so on. For example, a content provider may be a vendor of goods or services and may have purchased the ability to have content presented to callers who place calls while they are within some predetermined distance of the content provider.

Content presented on a communication device may fill the area of the target party's telephone display screen, or only a portion thereof. For example, when a call is placed to a commercial organization, content from a single source may cover the caller's entire telephone display. But, when a call is placed to one private party from another private party, some or all of the display area may be used to present content associated with one or both parties (e.g., from Facebook, MySpace, Slide, Flickr), and only a small area may be filled with content (e.g., an advertisement) from a third party. Thus, content displayed on a party's telephone may comprise multiple content components from the same or different sources or providers.

When content is presented to a caller pre-ring (before a destination party's telephone rings), the caller may activate a control embedded in the content to take some action offered by the content. For example, if he activates a control to re-route the call to a different destination (e.g., based on an offer or advertisement in the presented content), the call controller or the call processor logic on the caller's telephone will cancel the attempted call and initiate a call to the new destination. Or, a caller may be presented with content that offers to route the voice channel differently (e.g., via a different carrier for a cheaper rate).

In some embodiments of the invention, a call server and a separate call controller may cooperate to control the presentation of content to a caller and/or a called party. For example, and as shown in FIG. 1, data channels may be established between the parties and a call server, and the call server may be responsible for actually transmitting content to the parties and receiving any data they submit.

The separate call controller, however, may be a third-party content provider (or other third party) and may determine (and/or dynamically provide) content to be provided to a particular party. Thus, a call server may participate in many calls, and connect to different call controllers for different calls (or at different times during one call) to receive content to be presented to a party. Even when a call server and a call controller are co-located, content to be served to callers and/or called parties may be retrieved from other parties.

As one alternative, a call may be initially handled by a call server, perhaps to facilitate presentation of appropriate pre-ring content to a caller or called party. However, at some point (e.g., when the called party's telephone rings), control of content presentation may be passed to a call controller associated with or employed by the called party. As yet another alternative, control of content presentation may be passed immediately to an organizational call controller when a call destined for that organization is identified.

Figure 2:
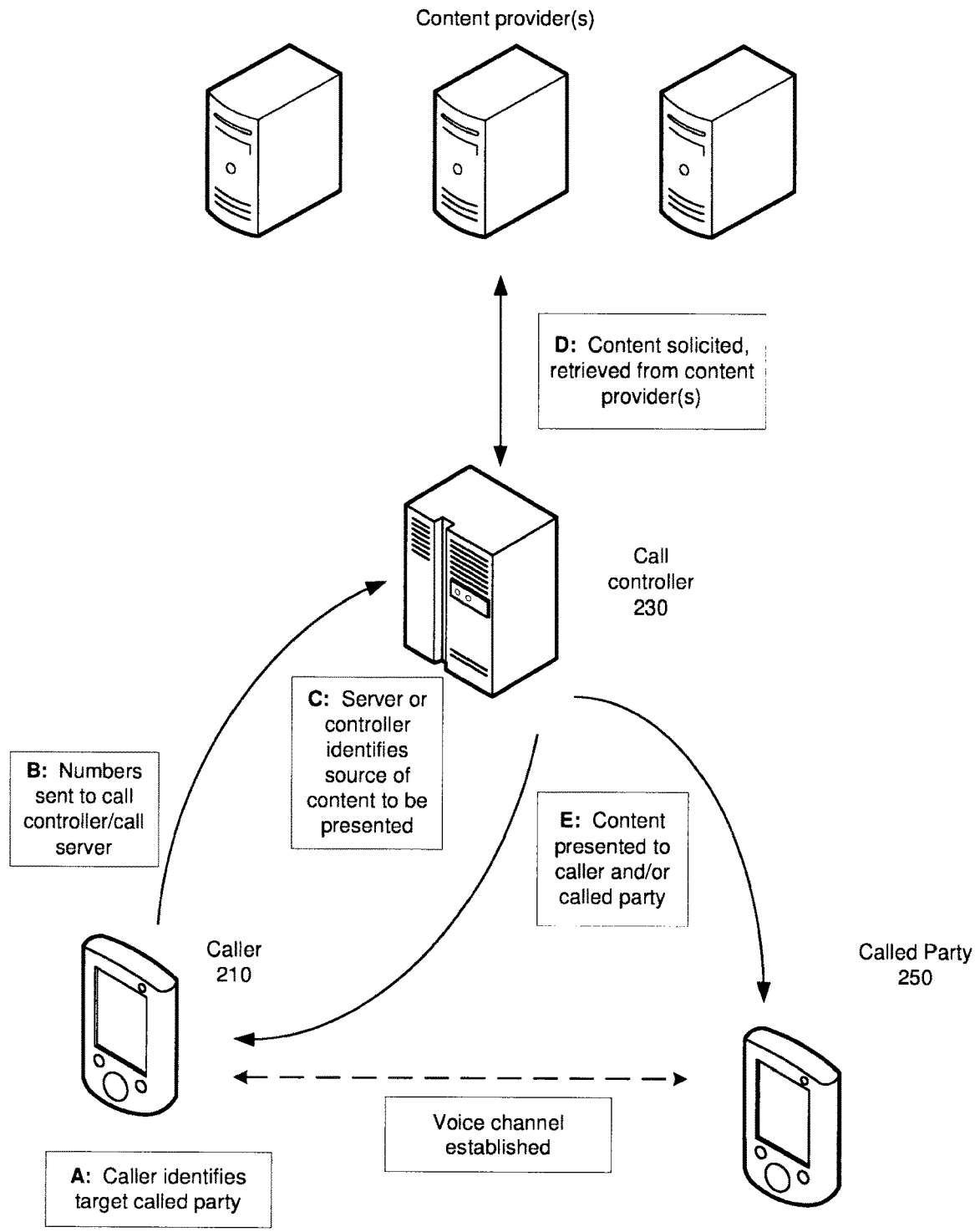
FIG. 2 is a block diagram demonstrating establishment of a telephone call and associated presentation of content, according to some embodiments of the invention.

FIG. 2 is a diagram illustrating presentation of content to a caller and/or a called party in association with a telephone call, according to some embodiments of the invention.

At step A, the caller enters or selects a telephone number or contact listing for called party 250, in order to initiate a voice call to that party. Alternatively, she may enter part of the target party's name or number and select the party from results produced by her communication device and/or a source external to her device. At step B, the telephone numbers and/or other identifiers of the caller and called party (e.g., IP addresses if either party is using VoIP equipment) are transmitted to call controller/call server 230 via a data channel of the caller's telephone.

Control of the call may be passed to a particular call controller, based on an identity of the caller or the called party. Specifically, calls from a certain number (or set of numbers, such as those of a single organization) or to a certain number (or set of numbers) may be controlled by predetermined call controllers. Or, call controller 230 may be a general call server configured to handle presentation of calls involving private parties and/or multiple organizations.

In step C, call controller 230 identifies a source of content to be presented to caller 210 and/or called party 250, or may identify specific content (i.e., not just a content source). In step D, the call controller solicits content from a selected source, which may be a web server, a data server, an advertisement server or other repository of advertisements, an organization's data server, etc.

Content may be selected for presentation based on an identity of a particular party, a relationship between the caller and the called party, an assumed (or known) purpose of the call, and/or other factors.

In step E, call controller 230 forwards the selected content to either or both of the caller and the called party. In some embodiments, the content may be served directly to a caller or called party from a content provider. Content may be presented to either party before the called party's telephone rings, during the parties' call, and/or after the call is terminated.

The voice channel between caller 210 and called party 250 may be routed and established in a normal fashion. However, initiation of the connection may be delayed for a short period of time (e.g., by call processor logic operating on the caller's telephone). Thus, the actual voice connection may be completed any time after step A.

Illustrative content that may be presented to a caller or a called party pre-ring includes commercial offers and advertisements (e.g., if the other party is a commercial organization), private content such as pictures, communications, present status, current location (e.g., if the other party is a private individual), notifications, alerts, an identifier of the other party to the call (e.g., a corporate logo, a personal avatar), etc. As part of pre-call content, a caller may be able to better target his destination party. For example, if he is calling an organization's main (or toll-free) number, he may be presented with content that allows him to choose a particular office or outlet (e.g., based on city or address).

Illustrative content that may be presented to a party during a call includes any or all types of content that may be presented pre-ring. In-call content may also or instead relate to the parties' voice connection, perhaps to provide visual description of a subject of the parties' conversation, to graphically show different products or product options, to show a transcript of the conversation in real-time or near real-time (or provide other assistance to a hearing-impaired party), to guide a party through an IVR (Interactive Voice Response) menu, to provide customer assistance graphically (instead of or in addition to verbally), to exchange information textually/graphically instead of having to speak it or punch it in via a keypad, to promote an up-sell, to guide a party through an organization's telephone directory to find a desired person, etc.

Illustrative post-call content includes content that may be presented pre-ring and/or in-call. Post-call content may also or instead summarize the parties' conversation or transaction, provide a receipt, identify follow-on actions, confirm a later appointment or other scheduled event, etc.

Figure 3:
FIGS. 3-8 demonstrate content that may be presented on a communication device of a caller and/or a called party before, during and/or after a telephone call, according to some embodiments of the invention.

FIG. 3 illustrates content that may be presented to a caller or a called party in association with a telephone call, according to some embodiments of the invention.

Content 310 reflects the presentation of a logo, profile, or other content that identifies an organization. In particular, content 310 comprises an advertisement of a merchant. Content 310 may be presented to a caller when she initiates a call with the indicated merchant, or may be presented to a called party when the merchant calls her (e.g., to verify an order, to report on an order status, to obtain additional information). Or, the illustrated content may be presented when a person engages in a call with a competitor of the indicated merchant, or another party unrelated to the merchant.

Content 350 includes not only a logo or other visual illustration of an organization, but also presents an offer of a product or service (i.e., a room upgrade). Illustratively, the recipient of content 350 may have booked a room reservation (with the indicated merchant or a competitor), or may be in the process of making a room reservation.

Thus content 350 may be presented while the recipient is engaged in a call with the offering merchant, in which case the recipient can verbally accept the offer or make an inquiry. Or, if the offer is presented when the recipient is not currently engaged in a call with the merchant, hitting a "dial" button, tapping the screen (if it is touch-sensitive) or activating another control may initiate a call between the recipient and the advertising merchant so that she can take advantage of the offer.

In FIG. 3, a call controller managing the presentation of content 310 and/or content 350 may be a merchant featured in the content, especially for a call placed to the merchant or from the merchant. Or, the call controller may be a call server or other third party. Because the call controller may be a third party, calls during which the content is presented may not even involve a merchant identified in content 310 or content 350.

Figure 4:
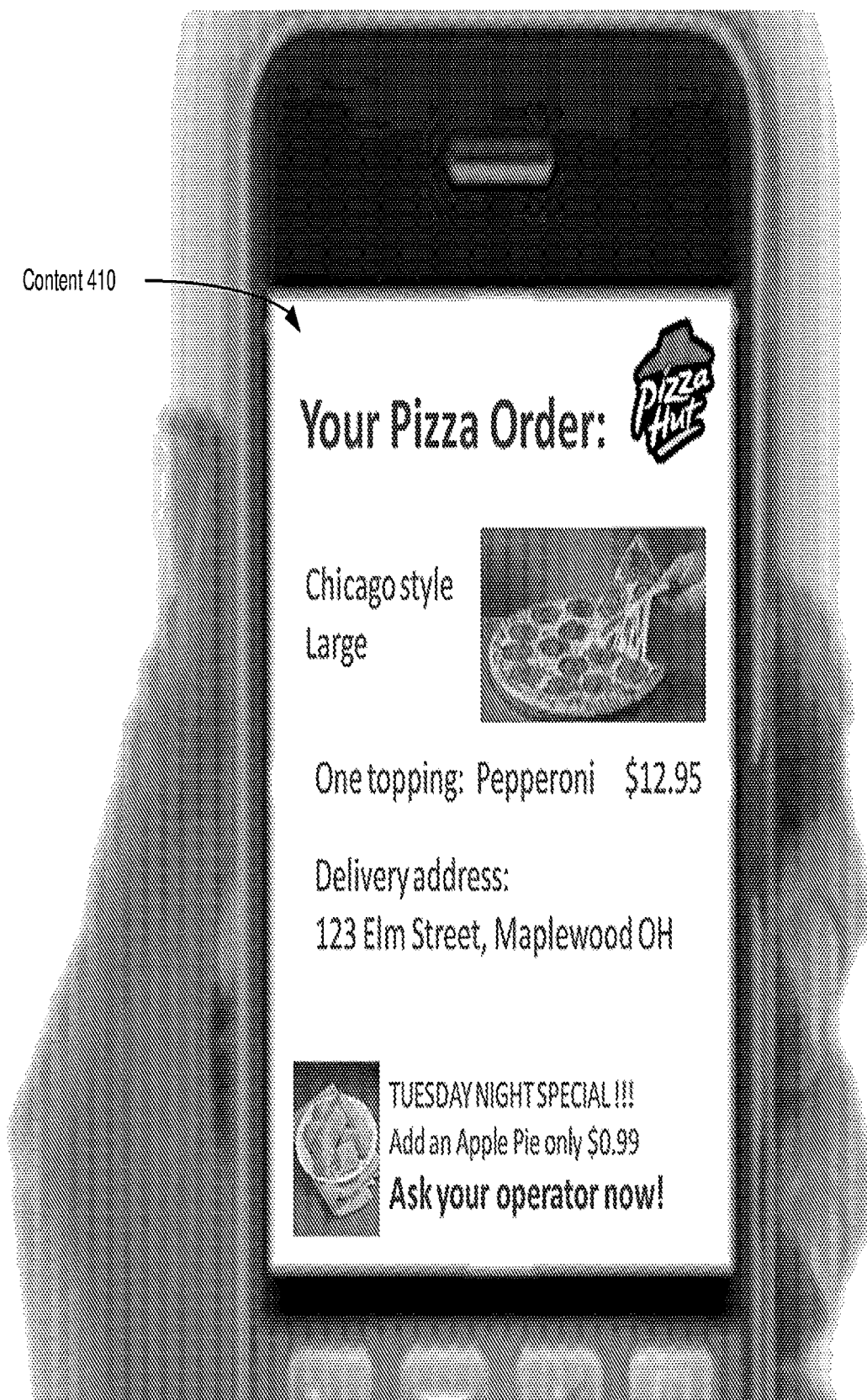

FIG. 4 also illustrates content that may be presented to a caller or called party in association with a telephone call, according to some embodiments of the invention.

Illustratively, content 410 may be presented to a caller during a call with the indicated pizza vendor. Content 410 not only allows the merchant and the caller to verify the caller's current order, but also comprises an advertisement or offer for an additional purchase, and may be presented before, during, or after the call. Specifically, content 410 verifies the customer's order (i.e., for one large Chicago-style pizza, with pepperoni) and the delivery address, and also reminds the customer of a special offer (i.e., $0.99 apple pies on Tuesday nights).

Content 410 may also, or instead, provide a control that the caller can actuate to cause the caller's address (e.g., home address, work address, current address) to be transmitted to the merchant or call controller. Illustratively, address information may be stored on the caller's communication device (e.g., in a contact record associated with the caller) and may be automatically transmitted to another party when the caller initiates such action.

In FIG. 4, the call controller that manages the presentation of content on the customer's telephone may be a telephone agent associated with the pizza merchant. In this case, when the customer called the merchant, a data connection was automatically established between the controller (which may be local to or remote from the customer) and the customer. Thereafter, the call controller can determine what is presented to the caller.

Figure 5:

FIG. 5 also illustrates content that may be presented to a caller or called party in association with a telephone call, according to some embodiments of the invention.

Content 510 of FIG. 5 identifies a merchant or other organization with which a person has established a telephone call, completed a telephone call, or is about to call, or possibly a competitor of such a merchant. Content 510 includes coupon 520, and may be used during a call with the advertiser or offline (e.g., in person in a retail store). As indicated, the coupon may be automatically transmitted to the person's email address if the call controller or an associated call server knows his or her address, or if the person releases the address.

In other embodiments of the invention, other content may be presented to a party when he is engaged in a call with a merchant, or has initiated a call to a merchant. For example, the party's last transaction may be displayed, an outstanding balance or other account status may be presented, another merchant advertisement (e.g., from the yellow pages, from an email campaign) may be displayed. etc.

A call reflected in FIG. 5 may be controlled by the organization identified in the content (e.g., a telephone agent that is talking or has talked with the customer) or by a third party (e.g., a call server).

Figure 6:
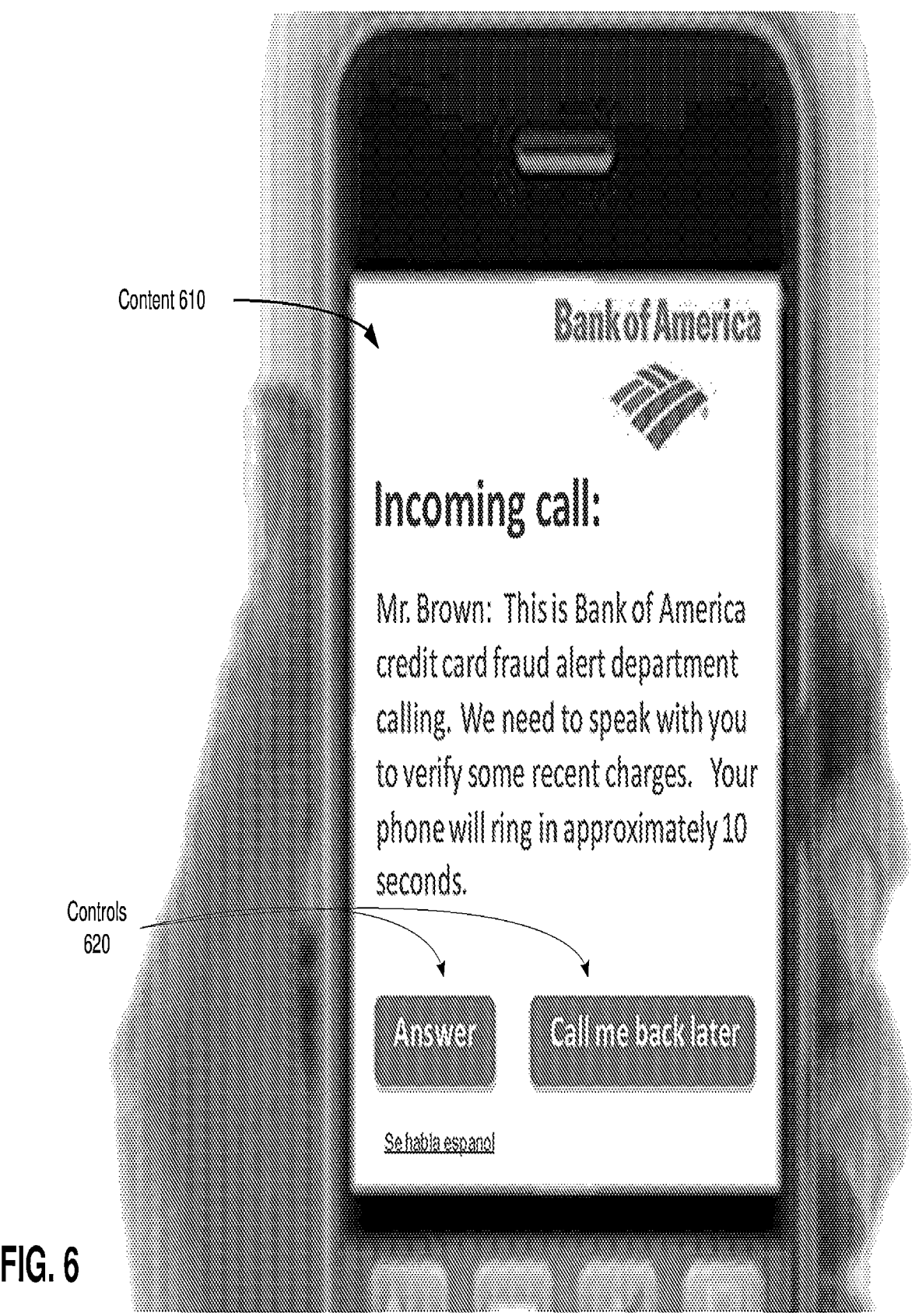

FIG. 6 illustrates content that may be presented to a potential called party in association with a telephone call, according to some embodiments of the invention.

Content 610 of FIG. 6 may be presented to a called party pre-ring (i.e., before her telephone rings), in association with a pending call from an organization, such as the indicated bank. As shown in FIG. 6, the content advises the party that the organization is placing a call to her telephone, and indicates a reason for the call. The party may be able to defer the call, agree to answer it, or take other action, by activating a corresponding control 620.

In some embodiments, advisory pre-ring content such as content 610 may include information to help verify the authenticity of the source of the upcoming call. For example, the organization may include some digits of the person's account number, give details of a previous transaction with the organization, etc.

In some embodiments, pre-ring content may include controls for taking action such as accepting the call as planned, completing the call immediately, postponing the call, scheduling it for a particular time, etc. Such controls may be included as part of the pre-ring content, or may be added by the call controller or the call processor logic on the receiving party's communication device.

A call controller for presenting content 610 may be the organization that wishes to contact the called party (e.g., a telephone agent, an account representative), or may be a third party.

Figure 7:
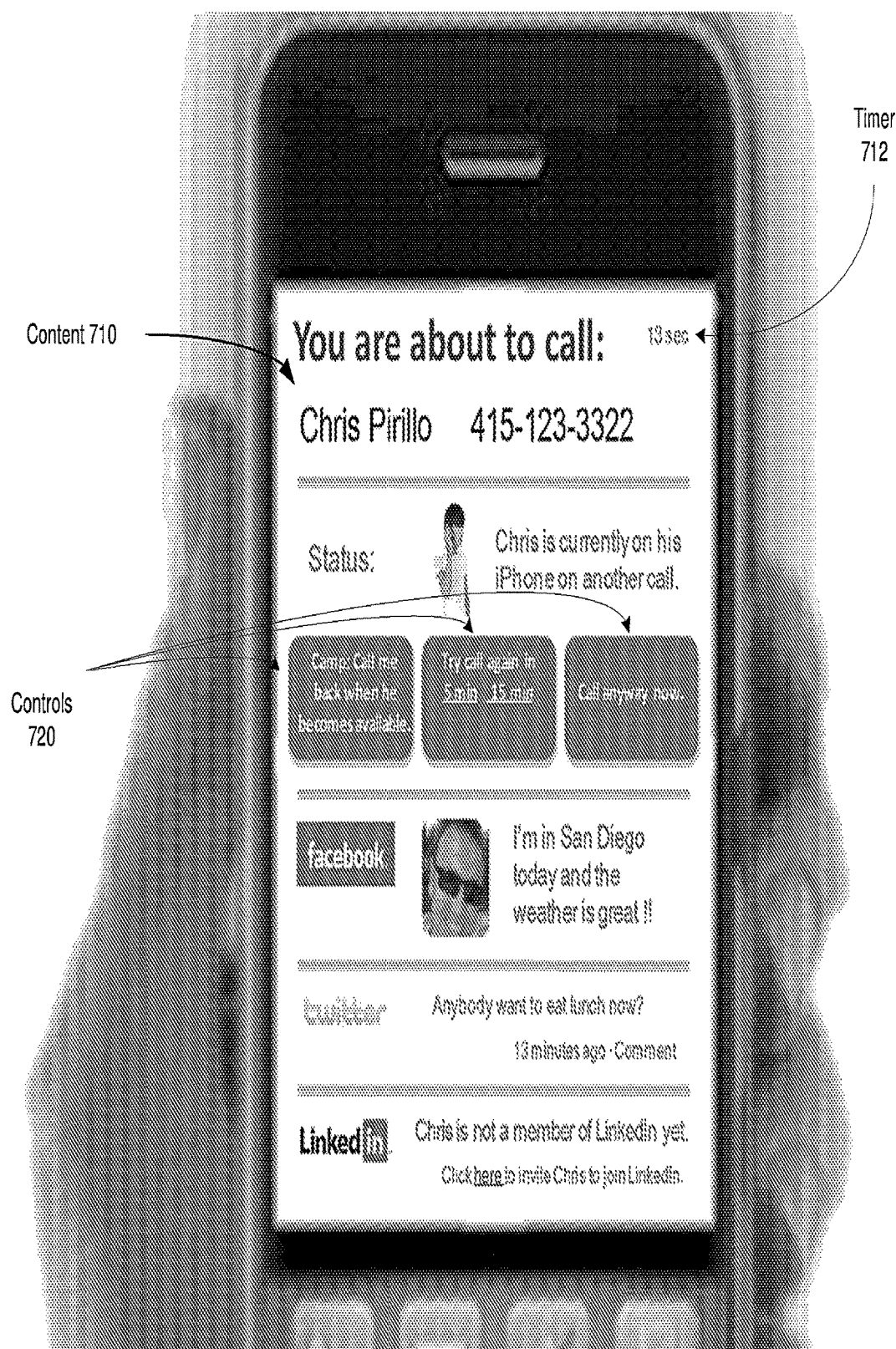

FIG. 7 illustrates content that may be presented to a caller in association with a telephone call, according to some embodiments of the invention.

Content 710 of FIG. 7 is presented to a caller pre-ring, when he commences a call to a friend or acquaintance (e.g., someone within her list of contacts or friends). Instead of only seeing the name and/or number of the person he is calling, the caller receives additional information regarding the called party and/or other people, such as a picture of the called party.

Pre-ring content 710 reports the current status of the target called party, which may be determined by the call controller or call server handling the data portion of this call. His status may be tracked by the call controller, especially if the call controller is associated with the called party's telephone service provider, in which case it can easily stay apprised of the status of the party's telephone.

Thus, the target called party's status may indicate that he is currently on another call, that he is otherwise busy, that his telephone is turned off, etc. Illustratively, he may have activated a control on his telephone that reports his status. Based on the called party's status, the caller may be offered options to have a return call placed to the caller when the called party is available, to try the call again, to continue with the call (e.g., to leave a voicemail or media message), to camp and wait for the called party to become available, etc.

Content 710 also includes an excerpt from the called party's (or a third party's) electronic presence (e.g., an excerpt from Facebook, MySpace or other web site), a recent Twitter message (from the called party or a mutual friend/acquaintance), an offer to make a further connection with the called party (e.g., via LinkedIn, hi5, Windows Live Messenger), a recent photo posted by the called party, and so on.

As indicated in FIG. 7, content 710 may be presented as pre-ring content, but some elements of the content may also (or instead) be presented as in-call or post-call content. Alternatively, in-call and post-call content may be completely different from content 710.

The called party may be presented with similar content pre-ring, in-call and/or post-call. Of course, instead of seeing content about himself, the called party would be presented content associated with the caller and/or third parties (e.g., mutual friends and acquaintances).

Content 710 includes timer 712 that indicates how soon the voice channel of the call will be connected or routed for connection. Illustratively, the voice connection may be delayed in order to determine and present the called party's status, to retrieve content to be presented, to allow the caller to review content 710 or to choose an alternate course of action if the called party is not currently available, or for some other reason. A control (e.g., one of controls 720) may, however, allow the caller to terminate the delay and proceed with (or attempt) the voice connection immediately.

A call controller for controlling presentation of content 710 in FIG. 7 may be the called party or a third party (e.g., a call server, a telephone service provider of the caller or the called party). For example, the called party may have specified certain content, or sources from which content may be retrieved, for presentation to someone when a call is established or is being initiated to him. Similarly, the caller may have identified content that may be displayed to the called party, in which case he may be considered the call controller for the called party's side of the telephone connection.

Figure 8:
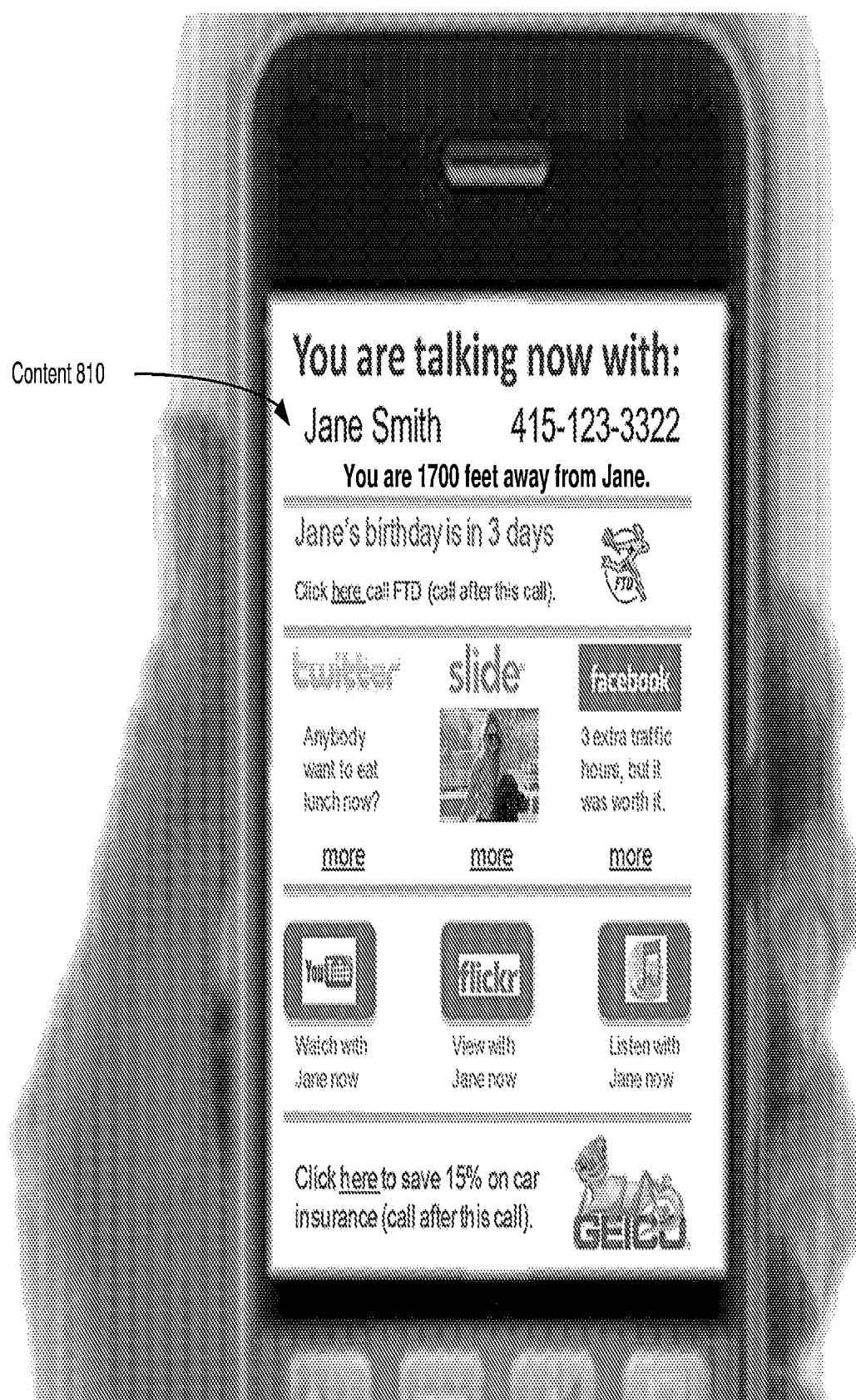

FIG. 8 further illustrates content that may be presented to a caller or called party in association with a telephone call, according to some embodiments of the invention.

Content 810 of FIG. 8 not only identifies the other party to a current call, but also includes content drawn from an electronic presence of the other party (or a third party), such as content from Facebook, Slide, Twitter and/or other web sites or content repositories. Yet other content may be accessed by either or both of the parties to the call, by activating an appropriate control within content 810 to open a YouTube video, view a photo at Flickr, listen to some audio, etc.

Content 810 may also provide personal information about the other party (e.g., her upcoming birthday), her approximate location (e.g., 1700 feet away), her status (e.g., in a meeting, dining, in transit).

An advertisement included with content 810 may be relevant to another portion of the content (e.g., a birthday announcement, a discussion of traffic, an invitation to dine), and/or may be associated with one or both of the parties' current locations (e.g., as reported by a GPS component of a party's telephone).

A call controller responsible for presenting content (or determining content to be presented) to a caller or called party in the call of FIG. 8 may be the other party, a call server or some other third party (e.g., the source of the advertisement).

As seen in FIGS. 3-8, pre-ring, in-call, and post-call content presented to a caller or called party may relate to any of the parties to a call and/or a third party. The content may include entertainment for one or more of the parties to enjoy before, during, and/or after the call, but may also include commercial information (e.g., sales offers, transaction details, advertisements, coupons). Commercial content presented to a party engaged in a call with an organization may be associated with that organization, a competitor, an associate, or an unrelated entity.

Content may include various controls for accessing additional content (alone or in unison with the other party to a call), for navigating to a party's page or presence at a particular web site, for affecting the voice channel of a call (e.g., to delay or reschedule a call, to leave a message, to add another party to the call), for accepting or viewing further details of an advertisement, and so on.

Some controls and actions offered via content presented on a party's communication device may involve altering the routing of a current call. For example, when a caller initiates an overseas call via a particular carrier, an advertisement or offer from a competing carrier may be presented pre-ring (e.g., to complete the call for $0.0X per minute). If the caller wishes to take advantage of the offer, he may activate a corresponding control within the presented content. Or, the offer may be presented as an offer or coupon during or after the original call.

Similarly, a caller may choose to route a call to a different destination based on pre-ring content. Thus, if a caller dials a commercial organization and an advertisement or offer from a competitor is presented pre-ring, the caller may accept the offer (e.g., by activating a control within the content), in which case the destination of the call is changed before the original called party's telephone rings.

In some embodiments of the invention in which a call is controlled by a third party (i.e., not the caller or the called party), the call controller may present to one party content associated with a competitor or an associate of the other party. For example, content selected for presentation may be provided by the highest bidder for calls targeting a particular merchant or from a particular caller, or from a caller matching a certain demographic (e.g., age, sex, location, income).

In some embodiments, before or during a current call, a caller (or called party) may specify that another call should be established when the current call is terminated. If multiple follow-on calls are desired, a queue may be established (and be viewable to that party). For example, if an advertisement or a communication from a friend/acquaintance is presented to the caller before or during a first call, he may activate an associated control to program his communication device to automatically place a follow-on call when the current call is completed.

As described previously, when a caller or called party's communication device is not capable of presenting rich content, pre-ring, in-call, and/or post-call content may be presented on a selected computing device. The content may be presented within a traditional browser program, within an application provided by an operator of a call server (or by some other entity), via an instant messaging program or electronic mail, or in some other manner.

Figure 9:
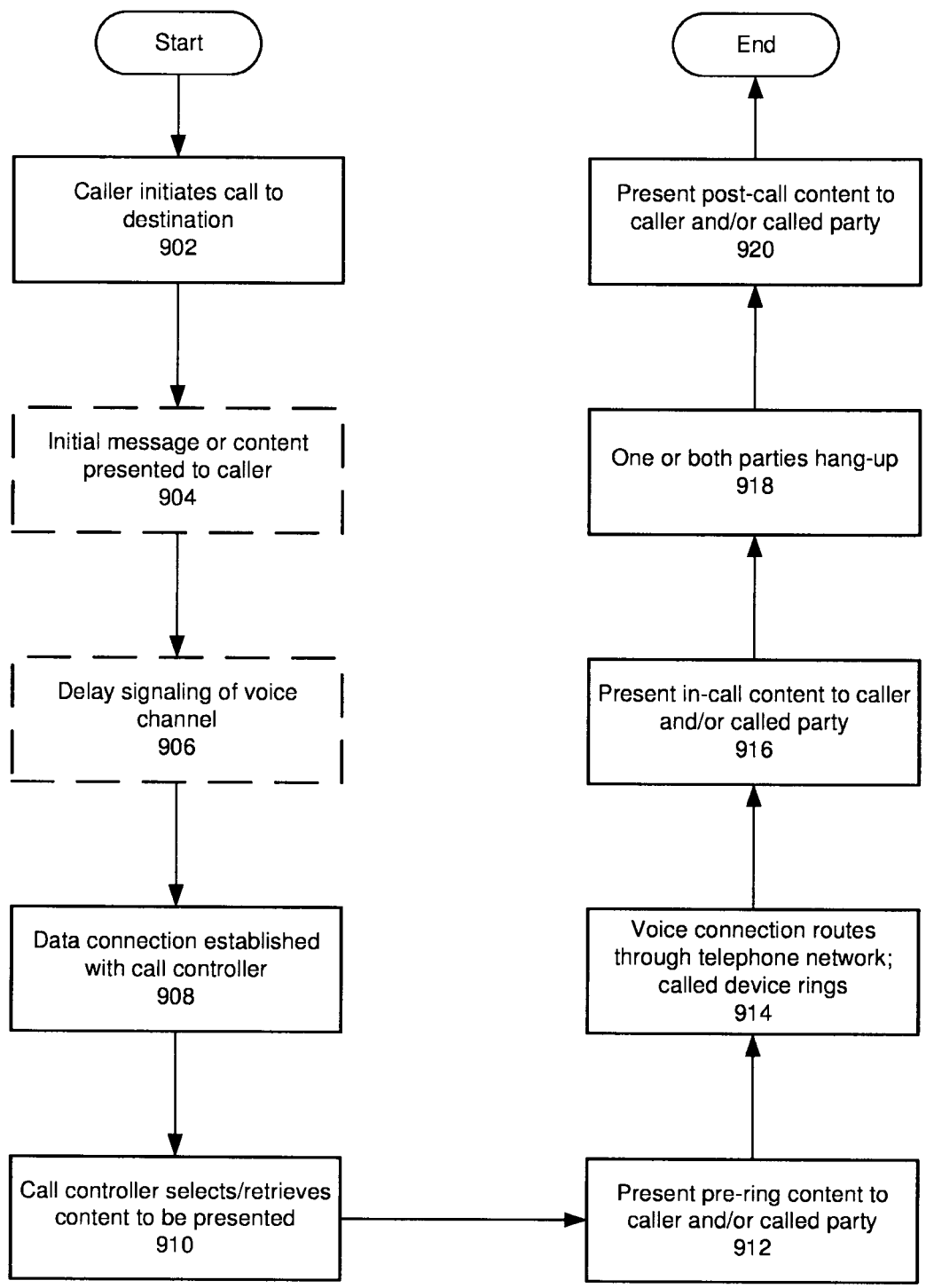
FIG. 9 is a flow diagram demonstrating the presentation of multimedia content to a caller and/or a called party in association with a telephone call, according to some embodiments of the present invention.

FIG. 9 is a flow chart demonstrating a method of controlling presentation of multimedia content in association with a telephone call, according to some embodiments of the invention. In these embodiments, content may be presented on a communication device or associated computing device of either or both a caller and a called party.

In operation 902, a caller initiates a call from a communication device. In some embodiments of the invention, a dialer or call processor on the caller's telephone is augmented or replaced by a dialer or call processor configured to facilitate such media presentation, or is modified to operate as described here.

A replacement or modified call processor program may be configured to immediately initiate a data connection with a call server or other controller when the caller enters the number to be dialed, when the caller selects the party to be called (e.g., from a list of contacts), or when the caller activates a control to place the call (e.g., a "dial" button"). Or, if the caller uses a search function to find a desired party by entering a partial name or telephone number, the search may be performed both on the user's device and off the device (e.g., at a call server), in which case the call controller can determine in real time that a call is being commenced.

In optional operation 904, the call processor (or other logic on the calling device) may present an initial message or content screen to the caller (if the calling device is capable of presenting such a message). For example, if the called party is known to be a friend of the caller, an initial message such as "Retrieving X's latest photo from Facebook . . . " or "Checking X's current status . . . " (where X is the name of the friend) may be displayed.

Or, if the called party is known to be a merchant that has an agreement with the call controller, a commercial-oriented message may be displayed, such as "Checking for personalized offers . . . " (if the called party is a vendor) or "Retrieving details of your previous transaction . . . ", etc.

Yet further, an initial set of content may be presented from local storage (e.g., a cache) on the caller's device. For example, for parties that the caller often communicates with (e.g., close friends, favorite take-out restaurants), content related to the parties (e.g., pictures, video shared between the parties, a menu) may be presented even before the call is connected. Depending on the resources of the caller's device, content related to any number of specific parties, and/or general content that may be displayed for calls to various parties, may be cached on the caller's communication device.

Thus, an initial message displayed even before the caller's call is placed may comprise a logo or advertisement of a commercial business, an avatar representing a friend or acquaintance, a picture of the called party, social content (e.g., from a social networking or content sharing web site), etc. Such content may be automatically refreshed on a regular or occasional basis. In some alternate embodiments of the invention, an initial message may simply indicate that the desired call is being placed (e.g., with minimal or no multimedia content).

In optional operation 906, the voice portion of the call is delayed. In particular, in the illustrated embodiment of the invention, signaling of the call via SS7 (Signaling System Number 7) or other telephone switching scheme may be automatically delayed by a short period of time (e.g., 1 second, 5 seconds, 10 seconds) to allow a data portion of the call to be established between the calling device and a call controller. As described above, the call controller may be a call server, a telephone agent (automated or human), an operator, or other entity.

A default period of delay may be increased or decreased based on an identity of the caller or called party, or the time necessary to collect and present appropriate content, and different delays may be associated with different parties. Yet further, once the data connection is established with the call controller (e.g., in operation 908), the calling device may be instructed to extend the delay or to reduce or eliminate any delay.

For example, if the call is being placed to a particular friend or acquaintance, and it is known that no relevant multimedia content is available regarding that person, the delay may be negligible. Alternatively, if the call controller is able to quickly determine that an electronic presence of the called party has recently been changed (e.g., at a web page on Facebook or MySpace or Slide), a delay may be lengthened to allow that page (or a portion thereof) to be retrieved and served to the calling device.

As another example, if the call is being placed to an unknown party, no content specifically relative to that party will be identified, and so there may be little or no delay. Alternatively, if the called party is a known commercial entity, the call controller may implement a delay sufficient to allow identification, retrieval, and serving of relevant content—such as details of a previous transaction, a status of a current transaction, an advertisement from a competitor, a special deal, a guide to an IVR (Interactive Voice Response) menu of the called party's telephone system), etc.

Voice connections to some telephone numbers (e.g., 911, 411, 0), to friends and acquaintances (e.g., private individuals within the caller's contact list), or to numbers matching certain patterns (e.g., anything less than seven digits, anything more than ten digits, anything with a * or # symbol) may be initiated without delay or otherwise treated in a special manner.

In operation 908, a data connection between the caller's communication device and the call controller is established, and the call controller receives the origination telephone number, the destination telephone number, and any related information (e.g., names of caller and called party, an indication of a frequency of contact between the parties, details of a previous call between the parties).

In some embodiments of the invention, the call controller is an agent associated with either the caller or the called party, especially when that party is (or represents) a company or other organization. Thus, presentation of content in association with calls placed to some organizations (e.g., large commercial companies) may be controlled by an agent that works for that organization. In these embodiments, the call controller can present to the caller special deals (e.g., sales, personalized offers, upgrades), details of a previous or current transaction between the caller and the organization, visual information regarding the organization or a product or service the organization offers (e.g., pictures, video, graphics), etc.

In other embodiments, a call controller may be a third party (e.g., the caller's or called party's telephone service provider, an operator of a call server). A third-party controller may control presentation of content related to either or both the caller and called party, and/or may present content relating to a different party. For example, a third-party call controller may present to a caller an advertisement for a competitor or affiliate of the called party, or present to the called party an advertisement for a competitor or affiliate of the caller.

A call controller may establish agreements with commercial (and/or other) entities to present their selected content (e.g., advertisements, special offers) to certain callers and/or called parties based on their identity or the identity of a party to which they would be connected if the current call is completed. The content to be presented may be selected at random, or may be based on an identity or profile of the caller or the called party.

In particular, a call controller (especially a third-party call server) may auction or otherwise sell content presentation to advertisers or other entities. The call controller may differentiate content presentation opportunities based on the caller and/or called party identities, geographical location of a party, party demographics, and/or any other characteristic.

Also in operation 908, the call controller may quickly attempt to ascertain a status of the called party. For example, by making (or attempting to make) a data connection to the called party's communication device, the call controller may determine that the called party is available, is on a call (and may be an identity of the other party), is in a meeting or is otherwise unavailable. Illustratively, such a status may be determined based on a status of the communication device (e.g., off-hook) or by a status set on the device by the called party (e.g., to forward calls, to initiate a silent mode of operation).

If the called party is unavailable, the caller may be offered the option to wait, to call later, to leave a message, to have the called party place a return call the caller, to automatically place a call from the caller to the called party when he/she is available, etc.

The call controller may also determine whether the communication devices of either the caller or called party are incapable of presenting multimedia content, in which case any content selected for presentation to that party may be presented on an associated computing device (if one has been identified).

Once the call controller learns the identities (or telephone numbers) of either or both the caller and the called party, it may block or allow the call based on a global block/allow list maintained at the call controller. For example, if the caller is a known telemarketer or spammer (or other undesirable caller), or perhaps even a suspected telemarketer, and the called party has opted to have calls from such sources blocked, the call controller may block the presentation of content to the called party and may even prevent the voice connection from being completed.

In operation 910, the call controller selects content to be presented to the caller and/or called party, and retrieves it from an internal database or from an external location. To select content for presentation, the call server may consider personal characteristics (e.g., age, sex, geographical location), behavior (e.g., browsing history, calling history, buying pattern) and so on, of the caller and/or the called party.

The call controller may also consider whether the caller or called party is known to have a personal web page, a page on a social networking or dating site, or some other electronic presence that can be accessed and that can be shared with the other party. Illustratively, subscribers may give permission to a call controller to access certain electronic information and present it to all or selected parties. Thus, friends and family members can specify that their electronic content on certain sites can be shared with certain people (or all parties) with which they communicate.

Content may be presented to either party pre-ring (i.e., before the called party's communication device rings), in-call (i.e., during a call), and/or post-call (i.e., after one or both parties hang up). The call controller may identify and/or retrieve content to be displayed in all phases at once, or may identify/retrieve content separately for the different phases. Information necessary to select appropriate content (e.g., identities of the caller and called party) may be received via the data connection—such as in the form of the parties' telephone numbers or network addresses (e.g., for VoIP calls).

Content to be presented to a party may change over time, or be replaced, even during a call. For example, if one of the parties updates a page of personal electronic content (e.g., on a social network site), that page or the changes may be automatically shared with the other party. Or, as a call with a commercial entity proceeds, presented content may be updated to reflect an order that is being placed for a good or service, to verify terms of a transaction, etc.

In operation 912, pre-ring content (i.e., content to be presented before the destination communication device rings) is transmitted to the caller and/or the called party via data channels.

In some embodiments of the invention, pre-ring content presented to a caller or called party comprises information that the call controller believes the party may be able to use or wish to see during the call. For example, if one party is an organization, the other party may be shown location information regarding the organization (e.g., the nearest shop or outlet of the organization), a profile or description of the organization, details of a previous or pending transaction with the organization, the status of an account with the organization, an offer from a competitor of the organization, a purpose of the call, a notification of the call, etc.

If the parties are friends or acquaintances, one party may be shown content drawn from a social networking site or other electronic presence of the other party (e.g., a photograph, a video), content shared between the parties, status information of the other party or a mutual friend/acquaintance, etc.

Thus, pre-ring content presented to a caller or called party may be associated with the other party and/or a third party (e.g., a competitor of one of the parties to the call, a mutual friend or relative of the caller and the called party). Further, the called party may be offered the opportunity to postpone or reschedule the call for a later time.

In operation 914, the voice channel of the call is routed normally (e.g., through the telephone network of the caller's service provider), and a communication device of the called party rings.

In operation 916, after the called party answers, in-call content (i.e., content presented during the call) is transmitted to each party's communication device (or associated computing device) for display to the caller and/or the called party. In-call content may be the same as, or different from, pre-ring content.

For example, if one party is a merchant, the other party may be presented with information regarding a current transaction with the merchant, possibly to verify what is being ordered, a delivery address, a method of payment, or other detail. This data may be updated dynamically as the call progresses. Or, if the caller and called party are collaborating on a document or other electronic product, some or all of that content may be displayed.

Yet further, one of the parties may select content stored on his or her communication device, or navigate a browser of their device to some content, and elect to share that with the other party. The call controller or a call server would then ensure the other party is able to access the content. Content may be shared in this manner before, during, and/or after a call. Even without an associated call, one party may be able to transmit data or content to another party via the system described herein, for off-line presentation to the other party.

One benefit of presenting in-call content is that a caller and a called party can engage in simultaneous data and voice connections. Although the voice connection will couple the caller and called party (and any other parties conferenced in), the data connection may couple each party to a call server or a call controller. They may therefore discuss and share electronic content in real-time.

If the call is not answered in operation 916, the caller may be able to leave a voice or multimedia message for the called party.

In operation 918, one or both of the parties hang-up, thereby terminating the voice channel of the call.

In operation 920, additional (post-call) content may be presented to either or both of the caller and the called party. Post-call content may verify a decision made during the call, provide a party with follow-on tasks (e.g., make a call to another party, view a web page associated with the other party), etc. Or, post-call content may be identical or similar to pre-call and/or in-call content.

In some embodiments of the invention, a person (or organization) may construct or design a custom set of content to be presented to another party before, during, or after a call to (and/or from) that party. The content may be static in that it comprises content that is selected once and does not change unless/until the person changes the content. Or, the custom content may comprise links to content or content sources that may change over time—such as the person's MySpace or Facebook page (or a particular frame of such a page). As the content changes, the updated content will be captured and presented to other parties as allowed by the originating party (e.g., limited to friends and family, displayable to all parties).

For example, a person may assemble a personalized hello screen or page (for playing at the beginning of a call) or a personalized goodbye screen (to be played after a call). Other personalized screens may be configured to be presented to another party in the case the person cannot take a call—such as one screen if the person is busy, and a different screen if the person is away from her phone—or for other reasons.

Such personalized content may include controls for taking some action. For example, if a called party is busy and cannot take the caller's call immediately, personalized content may be presented to the caller with a control that helps the caller navigate to the called party's social network web page, to a calendar for making an appointment or seeing when the called party will be available for a call, etc.

A call server or other entity may provide a web server or other online service to assist a subscriber in the creation and maintenance of a personalized page or screen of content to be presented to another party when the subscriber calls (or receives a call from) the other party. This service may be independently operated or may be hosted by another online presence, such as MySpace, Facebook, Slide, etc.

Other parties, particularly organizations, may develop custom pages or screens independently. Custom screens may be cached on a call server, stored with a call controller, or maintained elsewhere (e.g., in the organization's data center) in anticipation of being retrieved for presentation. In some embodiments, a party's custom screen may be indexed by telephone number, by an identity of the party (e.g., name), and/or in another manner.

In addition to, or instead of, identifying or constructing default custom content to be presented to another party in association with a telephone call with that party, a person (or organization) may construct or select a simple pre-ring message to be presented to a targeted party. As described above, for example, a caller may issue a pre-ring message identifying a purpose for the pending call.

Before, during, after, and between calls, a party may push images, video, and/or other content to another party (e.g., an electronic contact or business card, an electronic birthday card, a shipping address or billing address, payment data, a receipt). Further, parties to a call may simultaneously access content located on one of the parties' devices or elsewhere.

Figure 10:
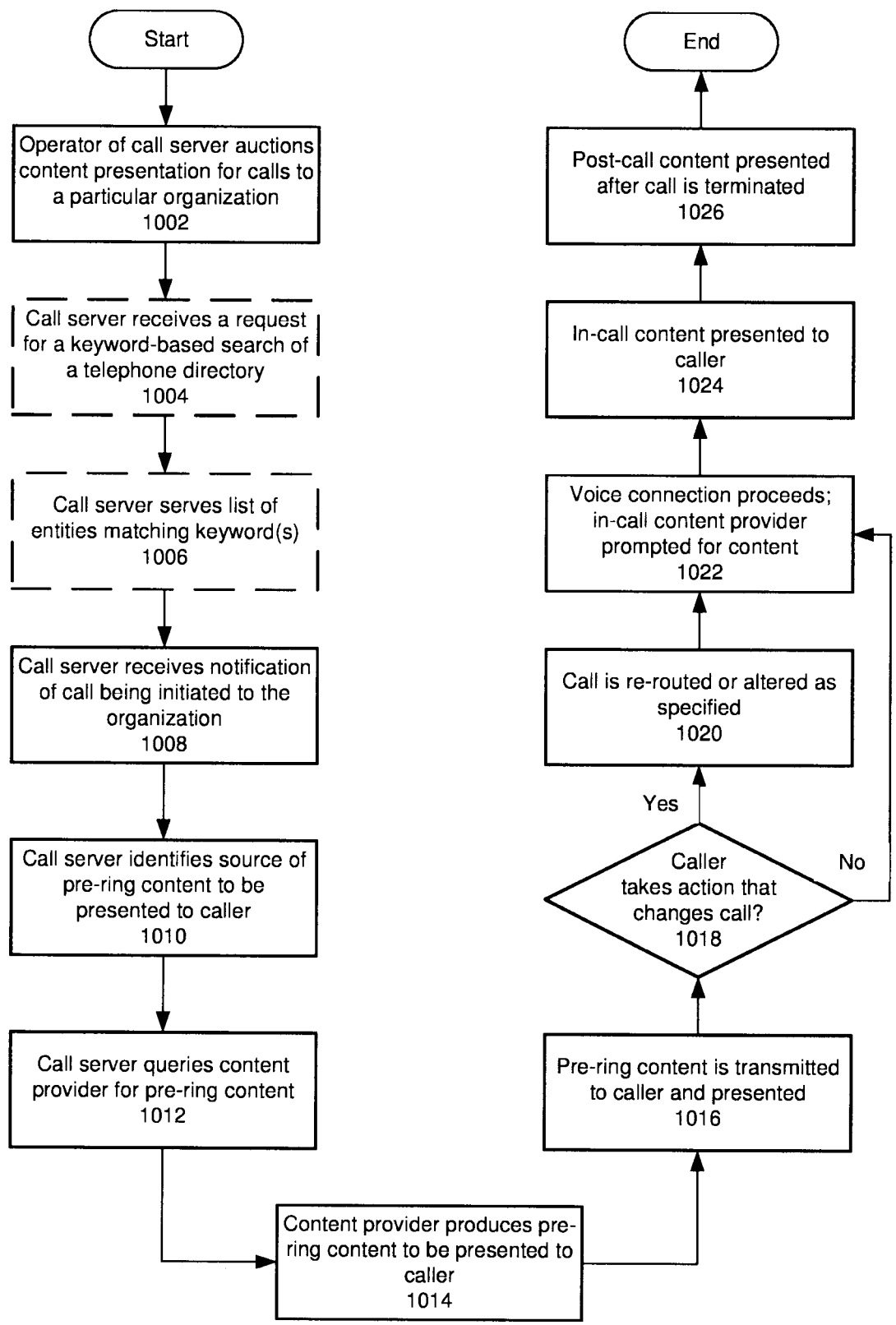
FIG. 10 is a flow diagram demonstrating the presentation of multimedia content to a caller in association with a telephone call, according to some embodiments of the present invention.

FIG. 10 is a flow chart demonstrating a method of presenting relevant content to a caller in association with a call to an organization (e.g., a merchant), according to some embodiments of the invention.

In operation 1002, an operator of a call server accepts bids for the opportunity to present content to persons calling the organization. In particular, third parties (and/or the organization itself) may bid an amount they are willing to pay the call server in return for the call server presenting the third party's selected content to some number of callers that initiate calls to the organization.

This operation may be part of a larger effort in which the call server auctions the ability to present content to persons that will call various organizations. In different embodiments of the invention, content selected by the winner of an auction may be cached on a call server, may remain with the winner or may be cached elsewhere (e.g., an ad server). The call server may auction different call types separately—such as calls from different geographical areas, calls from callers matching different demographics, calls to a specific subset of the destination organization's telephone numbers, etc.

Because content may be presented to a caller pre-ring (before the destination party's telephone rings), in-call (during the call), and/or post-call (after the call), different parties (or the same party) may earn the right to have their content presented at different times. Thus, one party may supply pre-ring content while other parties present in-call and post-call content. Or, one party may win the right to supply multiple stages of content in association with one call.

Further, multiple parties may obtain the opportunity to present content at the same time. For example, one type of content (e.g., pre-ring content) may be configured to comprise two (or more) components or frames, and each component may be populated by a different source.

In some embodiments of the invention, a party (e.g., the organization) may obtain the ability to directly control the presentation of content on the caller's communication device at some phase, especially during and/or after the call. Thus, while a different party, such as a competitor of the organization, may serve pre-ring content for a caller, once the call is connected to the organization, the organization may be able to dynamically select and present content to the caller.

In optional operation 1004, the call server receives a destination telephone number lookup request from a caller's communication device (e.g., telephone). More specifically, in the embodiments of the invention reflected in FIG. 10, a caller may initiate a keyword-based lookup of a destination telephone number. The keyword received in operation 1004 may or may not match the organization identified in operation 1002.

To perform a search, the caller may enter a portion of the name of a desired destination by spelling it out with his telephone's keypad or by speaking it into the telephone's microphone. That input may be used (and converted to text as necessary) to lookup matching parties locally (i.e., on the caller's communication device) and/or globally (i.e., on a call server or other location external to the caller's communication device).

It may be noted that a keyword-based search may involve searching for specific people and/or organizations having names that match a caller's keyword. Or, a keyword may identify a category of a good or service the caller desires (e.g., pizza, taxi, hotel, Chinese food), in which case the results will include parties that can provide the desired good or service.

Thus, if the caller enters several letters of a merchant's name or category of good (e.g., "h e r t", "m a r r i o", "p i z z"), searches may be initiated for people and/or organizations that match the keyword or input pattern. A search may return any number of results (zero or more), depending on how many characters are input, whether the caller is spelling the name correctly, how many telephone numbers are associated with parties that match the keyword, etc.

In some embodiments, the call server may auction or sell priority positions in keyword search results. Specifically, a party matching a keyword pattern (or even a party that doesn't match the pattern) may pay the call server to receive premium treatment in a list of search results served to the caller (e.g., by being placed at the top of the list, by receiving an entry having larger size, different color or other highlighting).

If multiple telephone numbers are found for a given party that matches the keyword(s), they may be ordered in some logical fashion. Thus, a local or toll-free number for the party may be prioritized higher than a long-distance number, a matching party that the caller has called before may be prioritized above one that he or she has not called before, etc.

Of note, a search or directory lookup initiated by a caller in operation 1004 may simultaneously or sequentially search the caller's local communication device and a call server (and/or a third-party directory), with only a single command or control activation. Thus, the caller can initiate a search of multiple data repositories, local and remote, with a single command.

Besides searching a person's contact list on their local communication device and/or a central call server (or call controller), a directory lookup or contact search may also search contact information stored in the person's electronic online presence. Thus, contact information within the person's page on MySpace, Facebook or other social site may be searched. Yet further, a search may be conducted within a third-party data repository, such as online yellow pages, a university's or other organization's telephone directory, etc.

In optional operation 1006, the call server serves a list of search results. The results may be ordered alphabetically, by popularity or some other rating, by location (e.g., distance from the caller), by payments received from parties in the list, etc. A list of results provided by the call server may be merged with a list of results generated by the caller's communication device.

In operation 1008, the call server is notified of a call being placed to the organization. Illustratively, the caller may have initiated the call by selecting or activating an entry within the list of search results received in operation 1006, or may initiate the present call at some later time. Notification of the call may be received via a data channel hosted by the caller's communication device.

Alternatively, the notification may be received via a data connection with the caller's telephone service provider. This may occur if the caller's communication device does not have a data channel or is not capable of presenting rich content.

Routing of the caller's voice connection may be automatically delayed by the caller's communication device or by the caller's telephone service provider. For example, the destination organization may be recognized as a commercial entity, and call processing logic on the caller's device (or at the caller's service provider) may be configured to delay calls to commercial organizations so that appropriate content can be selected and presented to the caller.

In operation 1010, the call server identifies a source of pre-ring content to be presented to the caller, based on the destination telephone number (i.e., the organization), the caller's identity, the caller's location, and/or other factors. Based on the auction of operation 1002 for example, the call server may be configured to serve content provided by the winner of the auction to the next X number of callers that place calls to the organization, or to callers matching some specific criteria.

In operation 1012, the call server queries the content provider for the pre-ring content. Alternatively, such content may be pre-identified, in which case the call server may automatically retrieve it.

If the pre-ring content must be retrieved from the content provider, the call server may provide information regarding the caller (e.g., telephone number, name, demographic data). Such information may be used by the content provider to select particular content; for example, the content provider may wish to present different content to callers that it "knows" than to unknown callers. Therefore, if the caller has a relationship with the content provider, the content provider may produce content comprising a different offer, advertisement, or other message.

In operation 1014, the content provider submits pre-ring content to the call server that it would like to have presented to the caller or, alternatively, identifies a location (e.g., URL, network address) from which the content may be retrieved.

In operation 1016, the call server transmits the selected pre-ring content to the caller's communication device, and call processing logic (or other logic) operating on the device presents the content to the caller. Alternatively, browser logic (or other logic) operating on the communication device may be instructed to retrieve the content from one or more specified locations. For example, the pre-ring content may comprise one or more components stored in one or more locations, and the browser logic may be responsible for retrieving the components, assembling them, and presenting the content.

As described previously, if the caller's communication device is incapable of receiving or displaying the content, the content may be presented on a computing device associated with the caller.

In operation 1018, the caller's communication device (or computing device) or the call server determines if the caller takes some action with regard to the pre-ring content that affects routing or processing of the voice connection.

For example, the pre-ring content may include an offer from a competitor of the organization, or an offer to route the call more cheaply, and the caller may activate a control associated with such an offer. The action may thus simply affect how the voice connection is routed, or may change the destination of the call. If the call is modified by the caller's action regarding the pre-ring content, the method continues at operation 1020; otherwise, the method advances to operation 1022.

In operation 1020, the call server or logic operating on the caller's communication (or computing) device implements the desired action. Thus, a call processor on the communication device may drop or cancel the current voice connection (which may not have been dialed yet) and select a new telephone number to call.

Note that if the call destination has changed (e.g., to a different organization), a different party may become responsible for providing content to be presented in-call and/or post-call.

In operation 1022, the voice portion of the call proceeds, either to the original destination or a new one specified by the caller in operation 1018. In addition, the call server queries or prompts the appropriate content provider for in-call content.

In an embodiment of the invention in which control of in-call content presentation completely passes to a call controller (i.e., content provider) other than the call server, such as the destination organization, such control may be passed in operation 1022. Specifically, once the call is confirmed to be destined for a particular organization, the organization may become the call controller for in-call content and possibly post-call content as well.

In operation 1024, in-call content is presented to the caller on his communication (or computing) device. As already described, the content may be served from the initial call server (after being identified by a responsible content provider), by the selected content provider, or may be served directly from an assigned call controller.

Even if a call controller separate from the call center has acquired control of in-call content presentation, such content may still transit a data channel established between the caller and the call server. Or, alternatively, the data channel may be re-routed to the call controller.

The in-call content may directly relate to the call, especially if the content is produced by the called organization. For example, if the in-call content is controlled by a human agent of the called organization, she may supplement information exchanged over the voice connection with audio and/or video data presented via the caller's telephone or computing device.

In operation 1026, post-call content is presented to the caller after he and/or the called organization hang-up. Such content may be produced by the called organization and/or by some other party that earned the right to have its content presented.

Post-call content may directly relate to the call (e.g., a receipt, an invoice, a transaction summary), may be unrelated, or may have some logical association—such as an offer for a good or service that complements (or competes with) something the organization sells or provides.

In some embodiments of the invention, pre-ring, in-call, and/or post-call content presented to a caller or a called party may include one or more coupons. In these embodiments, a coupon may comprise a graphical image of a coupon, a discount code, or any other textual or graphical display that grants the recipient a discount in purchase price or a special deal (e.g., one item free with the purchase of another item). An entire (or partial) image of the coupon may be presented, or just a link to the coupon may be presented (e.g., "Press here for a 25% off coupon!").

A coupon may be redeemed during a telephone call associated with the presentation of the content or at some later time. Call processor logic, coupon logic, or other logic operating on the recipient's communication (or computing) device may be configured to save coupons, at least until their dates of expiration. Coupons may also, or instead, be saved for a user at a call server, such as in a "coupon account" associated with the user, either by name or by a telephone number associated with the user.

A coupon database for storing coupons for award or presentation to users may be indexed or sorted by telephone number and/or name of the corresponding merchant, and may reside at a call server or a third party. Then, when a caller initiates a call to one of the telephone numbers or merchants, one or more coupons matching the target called party may be retrieved and presented.

Further, a coupon for a given merchant may be associated with a telephone number of a competitor or a merchant of an associated good or service, in which case a caller may not receive coupons only for the merchant that it intended to call. A set of coupons identified for presentation to a caller may be filtered by relevance, perhaps in consideration of the merchants' proximity to the caller, the time of day (e.g., in case some merchants are closed), etc.

A coupon may be presented pre-ring based on the telephone number being dialed or an identity of the target party. Or, in response to a directory lookup (e.g., based on a keyword) performed on a call server, a coupon may be served for an organization included in the list of results (or for a competitor of such an organization). Thus, if a caller enters a lookup for the keyword "pizza," along with a list of pizza vendors (possibly identifying their proximity to the caller), one or more coupons may be presented.

Along with presentation of a pre-ring coupon, a control for routing or re-routing the call to the offeror may be provided. If activated, the coupon (or notification of the coupon) may be passed to the offeror along with the call.

In-call presentation of a coupon may be triggered not only by a call server or call controller selecting such content to be presented to the caller, but may also be triggered based on coupons stored for the user—either locally on her communication device or centrally in the "coupon account" mentioned above. Thus, after a voice connection is completed to an agent for a particular merchant, the caller may be reminded of (e.g., shown) a coupon she possesses for the merchant. She can then pass to the agent a code within the coupon or perhaps activate a control that transmits the coupon to the agent.

As for post-call content, after a caller completes a call with a merchant, post-call content may include a coupon for use the next time the caller calls or visits the merchant. A post-call coupon may be automatically or manually saved.

A coupon presented to a caller (or called party) in association with a telephone call may include a limitation on how or when it may be redeemed. For example, a coupon for a lunch meal may only be good until 6:00 pm the same day. Another coupon may be valid until sometime further in the future. Similarly, a coupon may be limited to a specific area. For example, a particular coupon may only be good at a specific store or at a merchant's locations in a particular area code, city or state.

Yet further, a coupon may be limited to certain recipients. For example, a particular coupon may only be redeemable by members of a specific group (e.g., frequent fliers of a given airline, account holders at a given business), people meeting specified age or other demographic requirements, subscribers of a particular telephone carrier, etc.

To prove his qualification to use a certain coupon, a caller may be required to provide an account number or to manipulate his telephone to transmit a copy of a contact card evidencing his qualification. Alternatively, the caller's telephone number (e.g., via callerID) could be used to verify the caller's identity.

If a person's communication device is unable to display an electronic coupon, it may be displayed on an associated computing device.

As described above, a caller may initiate a search of contacts or one or more telephone directories from his communication device. In some embodiments, the caller merely needs to begin spelling a name of the desired destination. Each character that is entered is appended to any preceding characters and submitted to any local directories (e.g., a contact list on the communication device), as well as other repositories on a call server, an online telephone directory, an organizational contact list, etc.

Thus, as each character is entered, any number of contacts may be identified and used to populate a list presented to the user on the communication device. The list may shrink as the search becomes more specific and the number of matching contacts decreases, and some or all entries may be accompanied by controls the user can actuate to initiate a call to the corresponding destination.

As more and more callers generate searches and select their desired destinations, a call server (or a third party) can accumulate statistics and trends to identify specific destination parties that are most likely to be matches for a given sequence of search characters. This data may be used to refine the manner or sequence in which matching destination parties are presented.

In some embodiments of the invention, off-device contact lists or repositories may be shared among multiple users. A shared list may be updated by any or all of the participating users, who may be relatives, friends, members of an organization, classmates, etc. Thus, an update to a shared list submitted by one participant is automatically shared among all participants.

Entries may, however, be screened or filtered according to a particular participant's desires. For example, a given participant may not wish to share a particular contact with other participants, or may not wish to see specific contacts that were added by another participant (e.g., contacts that the given participant does not like).

A shared contact list may be stored at a call server or other central site and may be automatically searched when a list participant initiates a search from her device. In addition, some or all contacts from a shared list may be automatically copied to a participant's local device or a computing device (e.g., for synchronization with an address list stored on the device).

Figure 11:
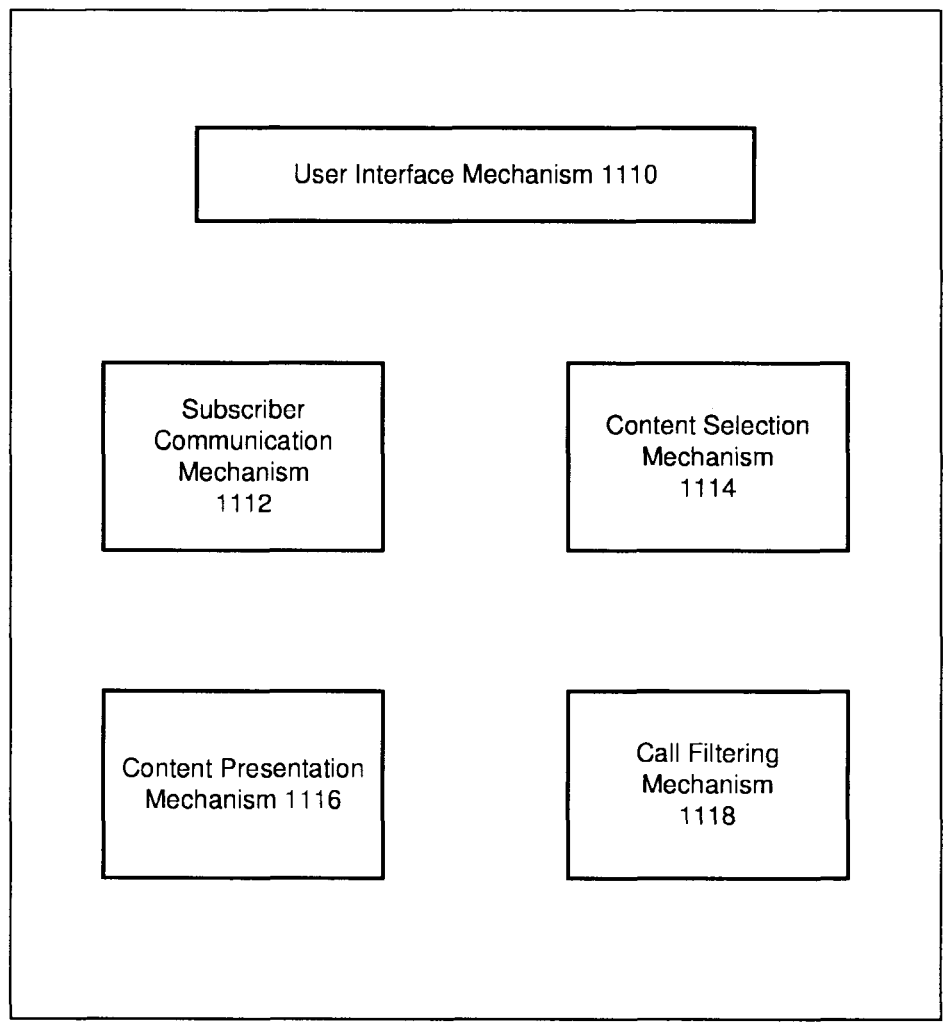
FIG. 11 is a block diagram of hardware apparatus for facilitating presentation of multimedia content in association with a telephone call, according to some embodiments of the invention.

FIG. 11 is a block diagram of hardware apparatus for facilitating presentation of multimedia content in association with a telephone call, according to some embodiments of the invention.

User interface mechanism 1110 of call server apparatus 1100 is adapted to facilitate computing interaction between the call server apparatus and subscribers (e.g., callers, called parties), and possibly third parties (e.g., advertisers, content providers, call controllers).

Illustratively, a subscriber may manipulate the user interface mechanism to configure his or her profile, to register a computing device on which content may be presented instead of a particular communication device (which may be identified by telephone number) that cannot present rich content, and so on. An advertiser or content provider may manipulate the user interface mechanism to identify (or upload) content to be presented to a subscriber, to bid on the right to present content, etc.

Subscriber communication mechanism 1112 is adapted to host data connections between the call server apparatus and communication devices (and/or computing devices) of callers and/or called parties, in association with a current, pending, or past voice connection between the parties. Thus, mechanism 1112 may be the component that learns of the initiation of a new telephone call and that receives the caller's and called party's telephone numbers.

Content selection mechanism 1114 is adapted to select a source of content (or to select specific content) to be presented to a caller or called party pre-ring, in-call, and/or post-call. Mechanism 1114 may select content or a content source based on the parties to the call, such as a content provider that has paid a fee in order to have its content presented. Or, if non-commercial content is to be presented (e.g., in association with a call between friends), the identified content or content source may relate to an online presence of either or both parties.

Content presentation mechanism 1116 is adapted to transmit content to a caller and/or a called party in some embodiments of the invention. In embodiments in which the content is transmitted from a different entity (e.g., a content provider, a call controller operated by a commercial organization), content presentation mechanism 1116 and/or content selection mechanism 1114 may cooperate with the entity to arrange for the transmission of the content. Or, control of the presentation of content may be handed off to an assigned call controller in place of content presentation mechanism 1116.

Call filtering mechanism 1118 is adapted to filter calls based on any desired criteria. For example, calls (or data transmissions) that are inbound to a subscriber may be filtered based on the originating number, to block calls from telemarketers, spammers, and/or other undesirable parties.

In other embodiments of the inventions, functions performed by the various mechanisms may be distributed among a different number of mechanisms.

Figure 12:
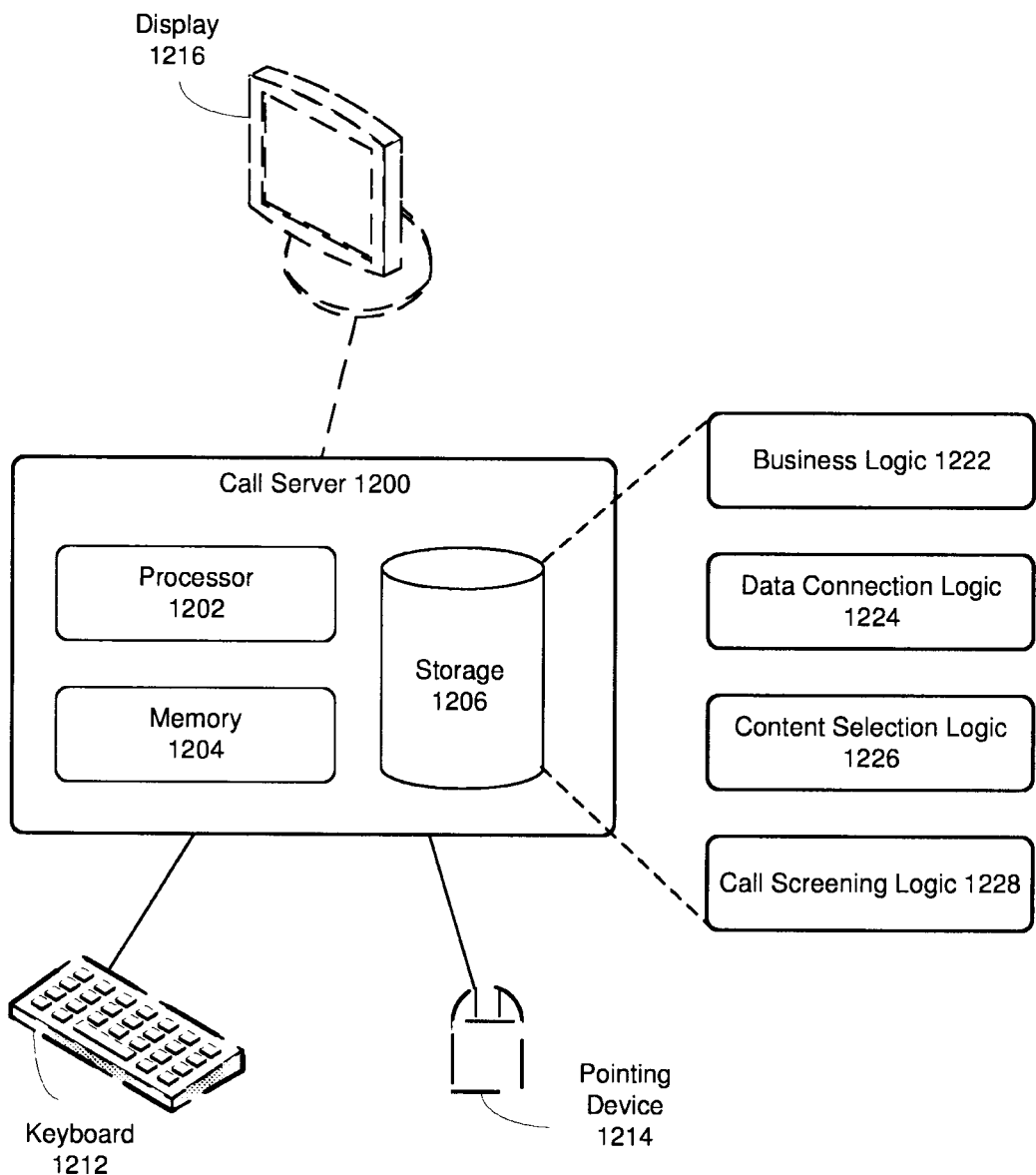
FIG. 12 is a block diagram of a call server for facilitating presentation of multimedia content in association with a telephone call, according to some embodiments of the invention.

FIG. 12 is a block diagram of a call server for facilitating presentation of multimedia content in association with a telephone call, according to some embodiments of the invention.

Call server 1200 of FIG. 12 comprises processor 1202, memory 1204, and storage 1206, which may comprise one or more optical and/or magnetic storage components. Call server 1200 may be coupled (permanently or transiently) to keyboard 1212, pointing device 1214, and display 1216.

Storage 1206 of the call server stores logic that may be loaded into memory 1204 for execution by processor 1202. Such logic includes business logic 1222, data connection logic 1224, content selection logic 1226, and call screening logic 1228. Additional logic may be stored and executed in other embodiments of the invention.

Business logic 1222 comprises processor-executable instructions for auctioning or selling an opportunity to have content presented to communication devices (and/or computing devices) in association with a telephone call, or for otherwise generating revenue in return for presenting content to callers and/or called parties.

Data connection logic 1224 comprises processor-executable instructions for establishing, maintaining, and terminating data sessions with communication and/or computing devices, to receive notification of call events, serve content, retrieve content from a party's communication device, etc.

Content selection logic 1226 comprises processor-executable instructions for selecting a source of content, or specific content, to be presented to a party to a telephone call. If presentation of content is to be controlled by an entity other than call server 1200, content selection logic 1226 (or another component of the call server) may select a call controller to manage the content presentation.

Call screening logic 1228 comprises processor-executable instructions for filtering, screening, and blocking calls placed to (or from) a subscriber. Calls may be blocked (or allowed) based on an identity of the other party or a nature of the call (e.g., spam, telemarketing, adult content).

Data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A first communication device for facilitating communication between a caller and a first called party having a second communication device, the first communication device comprising:
  a browser for presenting and navigating multimedia content;
  a storage component;
  a keypad operable by the caller to enter one or more characters to spell a word, wherein the keypad is operable to allow the caller to initiate a key-word based lookup of a destination telephone number, wherein the key-word based lookup of the destination telephone number returns a list of one or more results, wherein each of the one or more results is accompanied by controls that the caller can actuate to initiate a call to a corresponding destination, wherein the caller can initiate a call from the first communication device by selecting an entry within the list of the one or more results; and
  a screen, wherein the screen is operable to display content, wherein once a call is initiated, the screen renders real-time video information associated with the first called party,
  wherein while the screen renders real-time video information associated with the first called party, the keypad is operable to allow the caller to initiate a keyword-based lookup of a second destination telephone number,
  wherein the keyword-based lookup of the second destination telephone number returns another list of one or more results;
  wherein each of the one or more results is accompanied by controls that the caller can actuate to initiate a call to a corresponding destination; and
  wherein the caller can initiate a call from the first communication device to a second called party by selecting an entry within the another list of one or more results.

2. The first communication device of claim 1, wherein real-time video information associated with the first called party comprises a video showing a face of the first called party.

3. The first communication device of claim 1, wherein the first communication device is configured to allow the caller and the first called party to simultaneously access content located on the first communication device.

4. The first communication device of claim 1, wherein the first communication device is configured to allow the caller and the first called party to simultaneously access content stored on the storage component of the first communication device while the real-time video information associated with the first called party is transmitted to the caller.

5. The first communication device of claim 1, wherein the first communication device is configured to allow the caller to navigate the browser to content and simultaneously share the content with the first called party while the real-time video information associated with the first called party is transmitted to the caller.

6. The first communication device of claim 1, wherein the screen of the first communication device is further configured to display a picture associated with the first called party before initiating the call between the caller and the first called party.

7. The first communication device of claim 1, wherein the first communication device is configured to allow the caller, the first called party, and the second called party to simultaneously access content stored on the storage component of the first communication device.

8. The first communication device of claim 1, wherein the first communication device is configured to allow the caller to navigate the browser to content and simultaneously share the content with the first called party and the second called party.

9. The first communication device of claim 1, wherein a predetermined content is presented to the first called party before the screen renders real-time video information associated with the first called party and wherein the predetermined content is selected by the caller.

10. The first communication device of claim 1, wherein once a call is initiated, the screen renders real-time video information associated with the caller.

11. The first communication device of claim 1, wherein the first communication device is operable to communicate using Long Term Evolution (LTE).

12. The first communication device of claim 1, wherein said real-time video information is received from a call server, wherein said call server has a call processor, and wherein the call processor is configured to establish a data channel between the call server and the first communication device.

13. A method of facilitating communication between a caller having a first communication device with a storage component and a first called party having a second communication device, the method comprising:
 presenting and navigating multimedia content via a browser;
 providing a keypad operable by the caller to enter one or more characters to spell a word, wherein the keypad is operable to allow the caller to initiate a key-word based lookup of a destination telephone number, wherein the keyword-based lookup of the destination telephone number returns a list of one or more results, wherein each of the one or more results is accompanied by controls that the caller can actuate to initiate a call to a corresponding destination, wherein the caller can initiate a call from the first communication device by selecting an entry within the list of the one or more results;
 providing a screen, wherein the screen is operable to display content, wherein once a call is initiated, the screen renders real-time video information associated with the first called party; and
 allowing the caller to initiate a keyword-based lookup of a second destination telephone number while the screen renders real-time video information associated with the first called party,
 wherein the keyword-based lookup of the second destination telephone number returns another list of one or more results;
 wherein each of the one or more results is accompanied by controls that the caller can actuate to initiate a call to a corresponding destination; and
 wherein the caller can initiate a call from the first communication device to a second called party by selecting an entry within the another list of one or more results.

14. The method of claim 13, wherein real-time video information associated with the first called party comprises a video showing a face of the first called party.

15. The method of claim 13, further comprising allowing the caller and the first called party to simultaneously access content located on the first communication device.

16. The method of claim 13, further comprising allowing the caller and the first called party to simultaneously access content stored on the storage component of the first communication device while the real-time video information associated with the first called party is transmitted to the caller.

17. The method of claim 13, further comprising navigating the browser to content and simultaneously sharing the content with the first called party while the real-time video information associated with the first called party is transmitted to the caller.

18. The method of claim 13, further comprising displaying on the screen of the first communication device a picture associated with the first called party before initiating the call between the caller and the first called party.

19. The method of claim 13, further comprising allowing the caller, the first called party, and the second called party to simultaneously access content stored on the storage component of the first communication device.

20. The method of claim 13, further comprising navigating the browser to content and simultaneously sharing the content with the first called party and the second called party.

21. The method of claim 13, further comprising presenting a predetermined content to the first called party before the screen renders real-time video information associated with the first called party, and wherein the predetermined content is selected by the caller.

22. The method of claim 13, further comprising rendering via the screen real-time video information associated with the caller once a call is initiated.

23. The method of claim 13, further comprising using LTE to communicate with the first communication device.

24. The method of claim 13, wherein said real-time video information is received from a call server having a call processor, and further comprising establishing a data channel between the call server and the first communication device.

* * * * *